US008515854B2

(12) United States Patent
Lutnick et al.

(10) Patent No.: US 8,515,854 B2
(45) Date of Patent: Aug. 20, 2013

(54) SYSTEMS AND METHODS FOR PROVIDING DYNAMIC PRICE AXES IN FEATURED USER INTERFACES

(75) Inventors: Howard W. Lutnick, New York, NY (US); Joseph Noviello, New York, NY (US); Michael Sweeting, Aldershot (GB); James P. Stedman, New Providence, NJ (US); William P. Gill, New York, NY (US); Atul Bhatia, Bridgewater, NJ (US); Daniel Eccleston, London (GB); James L. Davies, London (GB)

(73) Assignee: BGC Partners, Inc., New York, NY (US)

( * ) Notice: Subject to any disclaimer, the term of this patent is extended or adjusted under 35 U.S.C. 154(b) by 1167 days.

(21) Appl. No.: 11/569,837

(22) PCT Filed: Jul. 29, 2005

(86) PCT No.: PCT/US2005/027174
§ 371 (c)(1),
(2), (4) Date: Nov. 30, 2006

(87) PCT Pub. No.: WO2006/015295
PCT Pub. Date: Feb. 9, 2006

(65) Prior Publication Data
US 2009/0043664 A1 Feb. 12, 2009

Related U.S. Application Data

(60) Provisional application No. 60/592,415, filed on Jul. 29, 2004, provisional application No. 60/629,696, filed on Nov. 19, 2004.

(51) Int. Cl.
*G06Q 40/00* (2012.01)

(52) U.S. Cl.
USPC .......................................................... 705/37

(58) Field of Classification Search
USPC .......................................................... 705/37
See application file for complete search history.

(56) References Cited

U.S. PATENT DOCUMENTS 5,809,483 A * 9/1998 Broka et al. ................. 705/37
6,134,535 A * 10/2000 Belzberg ................... 705/36 R
(Continued)

FOREIGN PATENT DOCUMENTS

| JP | H7-234772 | 9/1995 |
| JP | H10-21036 | 1/1998 |

(Continued)

OTHER PUBLICATIONS

U.S. Appl. No. 11/570,069, filed Dec. 5, 2006; 45 pages.

(Continued)

*Primary Examiner* — Kenneth Bartley

(57) ABSTRACT

The invention relates to systems and methods that provide a user interface for use with an electronic trading system. The interface includes a display that shows a bid price axis and an ask price axis, as well as corresponding sizes, and a visual indicator of the inside market. When the inside market changes in response to changing market conditions, the display of the inside market clearly shows a spatial movement of the inside market as well as the representative price(s) associated therewith, thereby rendering the two price axis dynamic axis. The user interface is easy to use, intuitive as well as customizable, and contains features that facilitate efficient electronic trading and shows trading activity pertaining to the user as well as the market in general.

33 Claims, 25 Drawing Sheets

(56) References Cited

U.S. PATENT DOCUMENTS

| | | | |
|---|---|---|---|
| 6,211,880 B1 | 4/2001 | Impink, Jr. | |
| 6,272,474 B1* | 8/2001 | Garcia | 705/36 R |
| 6,408,282 B1* | 6/2002 | Buist | 705/36 R |
| 6,766,304 B2 | 7/2004 | Kemp et al. | |
| 6,938,011 B1* | 8/2005 | Kemp et al. | 705/37 |
| 7,389,268 B1* | 6/2008 | Kemp et al. | 705/39 |
| 7,505,932 B2* | 3/2009 | Kemp et al. | 705/35 |
| 7,562,038 B1* | 7/2009 | Brumfield et al. | 705/35 |
| 2002/0059129 A1* | 5/2002 | Kemp et al. | 705/37 |
| 2002/0099644 A1 | 7/2002 | Kemp et al. | |
| 2002/0116317 A1* | 8/2002 | May | 705/37 |
| 2002/0143690 A1 | 10/2002 | Mahajan et al. | |
| 2003/0004853 A1* | 1/2003 | Ram et al. | 705/37 |
| 2003/0023536 A1* | 1/2003 | Hollerman et al. | 705/37 |
| 2003/0023542 A1* | 1/2003 | Kemp et al. | 705/37 |
| 2003/0065608 A1* | 4/2003 | Cutler | 705/37 |
| 2003/0069834 A1* | 4/2003 | Cutler | 705/37 |
| 2004/0070624 A1 | 4/2004 | Fushimi et al. | |
| 2004/0103054 A1 | 5/2004 | Singer | |
| 2004/0117292 A1 | 6/2004 | Brumfield et al. | |
| 2005/0125328 A1* | 6/2005 | Schluetter | 705/37 |
| 2005/0149429 A1* | 7/2005 | Kemp et al. | 705/37 |
| 2005/0187854 A1* | 8/2005 | Cutler et al. | 705/37 |
| 2005/0283415 A1* | 12/2005 | Studnitzer et al. | 705/35 |
| 2006/0190383 A1* | 8/2006 | May | 705/37 |
| 2006/0195389 A1* | 8/2006 | Kemp et al. | 705/37 |
| 2006/0259382 A1* | 11/2006 | Kemp et al. | 705/35 |

FOREIGN PATENT DOCUMENTS

| | | |
|---|---|---|
| JP | 2000-163191 | 6/2000 |
| JP | 2001-297195 | 10/2001 |
| JP | 2001-306293 | 11/2001 |
| JP | 2002-133113 | 5/2002 |
| JP | 2002-197281 | 7/2002 |
| JP | 2004-310352 | 11/2004 |
| JP | 2005-523506 | 8/2005 |
| JP | 2007-519091 | 7/2007 |
| WO | WO 2003/040983 | 5/2003 |
| WO | WO 2003/090032 | 10/2003 |
| WO | WO 2005/057353 | 6/2005 |

OTHER PUBLICATIONS

U.S. Appl. No. 11/608,303, filed Dec. 8, 2006; 49 pages.
PCT Search Report and Written Opinion for International Application No. PCT/US2005/027174; Jan. 24, 2006; 6 pages.
PCT Search Report and Written Opinion for International Application No. PCT/US2005/027320; Jan. 30, 2006; 8 pages.
U.S. PTO Office Action for U.S. Appl. No. 11/608,303; May 20, 2008; 11 pages.
U.S. PTO Office Action for U.S. Appl. No. 11/570,069; May 7, 2008; 11 pages.
U.S. PTO Office Action for U.S. Appl. No. 11/570,069; Sep. 26, 2008; 14 pages.
European Search Report for EP Application No. 05777630.4 dated Mar. 6, 2008; 8 pages.
European Search Report for EP Application No. 05779310.1 dated Mar. 6, 2008; 7 pages.
U.S. PTO Office Action for U.S. Appl. No. 11/608,303; Apr. 24, 2009; 12 pages.
U.S. PTO Office Action for U.S. Appl. No. 11/608,303; Oct. 2, 2009; 3 pages.
Australian Examination Report for AU Application No. 2005267780; Nov. 24, 2009; 4 page.
U.S. PTO Office Action for U.S. Appl. No. 11/608,303; 14 pages; Feb. 5, 2010.
U.S. PTO Office Action for U.S. Appl. No. 11/570,069; 27 pages; Jun. 30, 2010.
Tokyo Stock Exchange, Operational Systems Division, "Futures and Options Trading System, Operational Manual of Trading Terminals," Aug. 1998, 2-1, 5-1, 7-1, 17, 21, 22, 25, 26 (newly cited in the present report); 14 pages.
Money Match: Functional Specification, Aug. 1990, Version 1.0, by The Sequor Group Inc. Software Services.
Advisory Action for U.S. Appl. No. 11/570,069 dated Jan. 18, 2011; 3 pages.
U.S. PTO Office Action for U.S. Appl. No. 11/608,303; 14 pages; Oct. 14, 2010.
Pre Brief Conference Decision for U.S. Appl. No. 11/608,303 dated May 18, 2011; 2 pages.
Advisory Action for U.S. Appl. No. 11/608,303 dated Apr. 21, 2011; 2 pages.
Japanese Office Action for Application No. 2007-523872 dated Mar. 15, 2011; 6 pages (including English Translation).
AU Examination Report for AU Application No. 2005267739 dated Mar. 13, 2008; 1 page.
Notice of Acceptance for AU Application No. 2005267780 dated Feb. 3, 2010; 4 pages.
JP Official Questioning for Application No. 2007-523872; Sep. 18, 2012; 8 pages (includes English Translation).
Notice of Allowance for U.S. Appl. No. 11/608,303; 7 pages; Jun. 29, 2011.
JP Office Action for Application No. 2007-523872; Aug. 16, 2011; 7 pages (includes English Translation).
JP Office Action for Application No. 2007-523891; Aug. 16, 2011; 4 pages (includes English Translation).
JP Office Action for Application No. 2007-523872; Jan. 4, 2012; 7 pages (includes English Translation).
JP Office Action for Application No. 2007-523891; May 22, 2012; 8 pages (includes English Translation).
AU Examination Report for AU Application No. 2010201573 dated Jun. 1, 2012; 4 pages.
CA Examination Report for CA Application No. 2574975 dated Feb. 9, 2012; 6 pages.
AU Examination Report for AU Application No. 2010201573 dated Jan. 19, 2012; 4 pages.
AU Examination Report for AU Application No. 2010201573 dated Oct. 9, 2012; 4 pages.
JP Office Action for Application No. 2007-523891; Oct. 2, 2012; 27 pages (includes English Translation).
AU Examination Report for AU Application No. 2009245833 dated May 27, 2011; 2 pages.
AU Notice of Acceptance for AU Application No. 2009245833 dated Feb. 8, 2013; 3 pages.

* cited by examiner

FIG. 4

| | | | | |
|---|---|---|---|---|
| 20.5/7.11 | 4.250 8/14 JMONITOR | | | _ ▢ ✕ |
| | - | | 102.22 ◇ | 50 | |
| | - | | .21+ ◇ | 25 | |
| | - | | .21 ◇ | 25 | |
| | - | | .20+ ◇ | 25 | |
| | - | | .20 ◇ | 25 | |
| | - | | .19+ | - | |
| | - | | .19 ◇ | 25 | |
| | - | 1 TAK | .18+ | - | |
| | - | 6 TAK | 101.18 | 12 | 1 |
| | - | 101.17+ | 101.17+ | - | 1 |
| 6 | | ◇ .17 | | - | 79 |
| 1 | | ◇ .16+ | | - | |
| | - | .16 | | - | |
| 4 | | ◇ .15+ | | - | |
| | - | .15 | | - | |
| | - | .14+ | | - | |
| 6 | | ◇ .14 | | - | |
| | - | .13+ | | - | |
| | - | .13 | | - | |
| | - | .12+ | | - | |
| △ | 1 | 6 | 101.17 | | |

CLR

PI: BEST 1 2 3 NONE
LMT MKT

| 10 | 300 | CXL BUYS |
| 50 | 500 | CXL ALL |
| 100 | 1000 | CXL SELLS |

| | | | | | |
|---|---|---|---|---|---|
| 20.5/7.11 | 4.250 8/14 JMONITOR | | | | _ □ × |
| | - | | 101.22 ◇ | 50 | |
| | - | | 101.21+ ◇ | 25 | |
| | - | | 101.21 ◇ | 25 | |
| | - | | 101.20+ ◇ | 25 | |
| | - | | 101.20 ◇ | 25 | |
| | - | | 101.19+ | - | |
| | - | | 101.19 ◇ | 25 | |
| | - | | 101.18+ | 50 | |
| | - | | 101.182 | 2 | 1 |
| | - | | 101.18 | 12 | 1 |
| | - | 101.17+ | 101.17+ | - | 1 |
| | 6 ◇ | 101.17 | | - | 79 |
| | 10 | 101.172 | | | |
| | 1 ◇ | 101.16+ | | - | |
| | - | 101.16 | | - | |
| | 4 ◇ | 101.15+ | | - | |
| | - | 101.15 | | - | |
| | - | 101.14+ | | - | |
| | 6 ◇ | 101.14 | | - | |
| | - | 101.13+ | | - | |
| | - | 101.13 | | - | |
| | - | 101.12+ | | - | |

- 530 points to 101.182 / 101.18 rows
- 510 points to 101.172 row

| △ | 1 | 6 | 101.17 | |
|---|---|---|---|---|

| CLR | ⇅ | PI: | BEST | 1 | 2 | 3 | NONE |
|---|---|---|---|---|---|---|---|
| | | | LMT | | MKT | | |

| 10 | 300 | CXL BUYS |
|---|---|---|
| 50 | 500 | CXL ALL |
| 100 | 1000 | CXL SELLS |

*FIG. 5a*

| | | | | | |
|---|---|---|---|---|---|
| 20.5/7.11 | 4.250 8/14 JMONITOR | | | _ □ × | |
| | - | | 101.22 ◇ | 50 | |
| | - | | 101.21+ ◇ | 25 | |
| | - | | 101.20 ◇ | 25 | |
| | - | | 101.19+ | - | |
| | - | | 101.19 ◇ | 25 | |
| | - | | 101.18+ ◇ | - | |
| | - | 6 TAK | 101.18 | 12 | 1 |
| | - | 101.17+ | 101.17+ ◇ | - | 1 |
| | 6 | ◇ 101.17 | | - | 79 |
| | 1 | ◇ 101.16+ | | | |
| | - | 101.16 | | | |
| | 4 | ◇ 101.15+ | | | |
| | 6 | ◇ 101.13+ | | - | |
| △ | 1 | 6 | 101.17 | | |

| | | | | |
|---|---|---|---|---|
| CLR | ⇅ | PI: | BEST | 1 | 2 | 3 | NONE |
| | | LMT | MKT | |
| 10 | 300 | CXL BUYS | | |
| 50 | 500 | CXL ALL | | |
| 100 | 1000 | CXL SELLS | | |

*FIG. 6a*

| 20.5 / 7.11 | 4.250 8/14 JMONITOR | | | | _ □ × |
|---|---|---|---|---|---|
| | - | | 101.22 ◇ | 50 | |
| | - | | 101.21+ ◇ | 25 | |
| | - | | 101.20 ◇ | 25 | |
| | - | | 101.19+ | - | |
| | - | | 101.19 ◇ | 25 | |
| | - | | 101.18+ ◇ | - | |
| | - | 6 TAK | 101.18 | 12 | 1 |
| | - | 101.17+ | 101.17+ ◇ | - | 1 |
| | 6 | ◇ 101.17 | | - | 79 |
| | 1 | ◇ 101.16+ | | - | |
| | - | 101.16 | | - | |
| | - | ◇ 101.15+ | | - | |
| | 4 | ◇ 101.15 | | - | |
| | | | | | |
| | | | | | |
| | 6 | ◇ 101.13+ | | - | |
| △ | 1 | 6 | 101.17 | | |

| | | PI: | BEST | 1 | 2 | 3 | NONE |
| CLR | | LMT | MKT | | |
| 10 | 300 | CXL BUYS |
| 50 | 500 | CXL ALL |
| 100 | 1000 | CXL SELLS |

*FIG. 6b*

| | | | | | |
|---|---|---|---|---|---|
| | - | | 101.22 ◇ | 50 | |
| | - | | 101.21+ ◇ | 25 | |
| | - | | 101.20 ◇ | 25 | |
| | - | | 101.19+ | - | |
| | - | | 101.19 ◇ | 25 | |
| | - | | 101.18+ ◇ | - | |
| | - | 6 TAK | 101.18 | 12 | 1 |
| | - | 101.17+ | 101.17+ ◇ | - | 1 |
| | 6 | ◇ 101.17 | | - | 79 |
| | 1 | ◇ 101.16+ | | - | |
| | - | 101.16 | | - | |
| | 4 | ◇ 101.15+ | | - | |
| | - | ◇ 101.15 | | - | |
| | - | ◇ 101.14 | | - | |
| | 6 | ◇ 101.13+ | | - | |
| △ | 1 | 6 | 101.17 | | |

| | | | 20.5 / 7.11 | 4.250 8/14 JMONITOR | | _ | □ | × |

| | | | | |
|---|---|---|---|---|
| | - | | 101.22 ◇ | 50 |
| | - | | 101.21+ ◇ | 25 |
| | | | | |
| | - | | 101.20 ◇ | 25 |
| | - | | 101.19+ | - |
| | - | | 101.19 ◇ | 25 |
| | - | | 101.18+ ◇ | - |
| | - | 6 TAK | 101.18 | 12 | 1 |
| | - | 101.17+ | 101.17+ ◇ | - | 1 |
| | 6 | ◇ 101.17 | | - | 79 |
| | 1 | ◇ 101.16+ | | - |
| | - | 101.16 | | - |
| | 4 | ◇ 101.15+ | | - |
| | | ◇ 101.15 | | - |
| | | ◇ 101.14+ | | - |
| | | ◇ 101.14 | | - |
| | 6 | ◇ 101.13+ | | - |

| △ | 1 | 6 | 101.17 | |

| CLR | | PI: | BEST | 1 | 2 | 3 | NONE |
| | | LMT | | MKT | |
| 10 | 300 | CXL BUYS |
| 50 | 500 | CXL ALL |
| 100 | 1000 | CXL SELLS |

| USG_05Y JNOVIEL2 | | | | □ × |
|---|---|---|---|---|
| 99.206 | 104.002 ↓ | 100.04 ↓ | | -0.102 |
| | - | | 99.276 | - |
| | - | | 99.27+ | - |
| | - | | 99.272 | - |
| | - | | 99.27 ◇ | 50 |
| | - | | 99.266 ◇ | 50 |
| | - | | 99.26+ ◇ | 50 |
| | - | | 99.262 ◇ | 50 |
| | - | | 99.26 ◇ | 50 |
| | - | | 99.256 ◇ | 23 |
| | - | 99.25+ | 99.25+ | - |
| | - | 99.252 | 99.252 | - |
| | - | 99.25 | 99.25 | - |
| | - | 99.246 | 99.246 | - |
| 49 | 49 ◇ | 99.24+ | | - |
| 1 | 1 ◇ | 99.242 | | - |
| | - | 99.24 | | - |
| | - | 99.236 | | - |
| | - | 99.23+ | | - |
| | - | 99.232 | | - |
| | 47 ◇ | 99.23 | | |
| ▽ 1 | ⇅ | 2 | 99.256 | 481 |

*FIG. 11a*

| | 1110 | 1130 | 1140 | |
|---|---|---|---|---|
| ⊖ USG_05Y JNOVIEL2 | | | | _ ☐ ✕ |
| 99.206 | 104.002 | 100.04 | -0.102 | |
| | - | | 99.276 | - |
| | - | | 99.27+ | - |
| | - | | 99.272 | - |
| | - | | 99.27 ◇ | 50 |
| | - | | 99.266 ◇ | 50 |
| | - | | 99.26+ ◇ | 50 |
| | - | | 99.262 ◇ | 50 |
| | 99.252 | | 99.26 ◇ | 50 |
| | NONE | | 99.256 ◇ | 23 |
| | | 99.25+ | 99.25+ | - |
| | 1 | 99.252 | 99.252 | - |
| | 50 | 99.25 | 99.25 | - |
| | 100 | 99.246 | 99.246 | - |
| | 300 | ◇ 99.24+ | | - |
| | 500 | ◇ 99.242 | | - |
| | 1000 | 99.24 | | - |
| | | 99.236 | | - |
| | - | 99.23+ | | - |
| | - | 99.232 | | - |
| | 47 | ◇ 99.23 | | - |
| ▽ | 1 ⇳ | 2 | 99.256 | 481 |

1161 → (dotted box around "1")
1111 →
1160 →
1150 → (bottom row indicator)

*FIG. 11b*

Figure 11C:
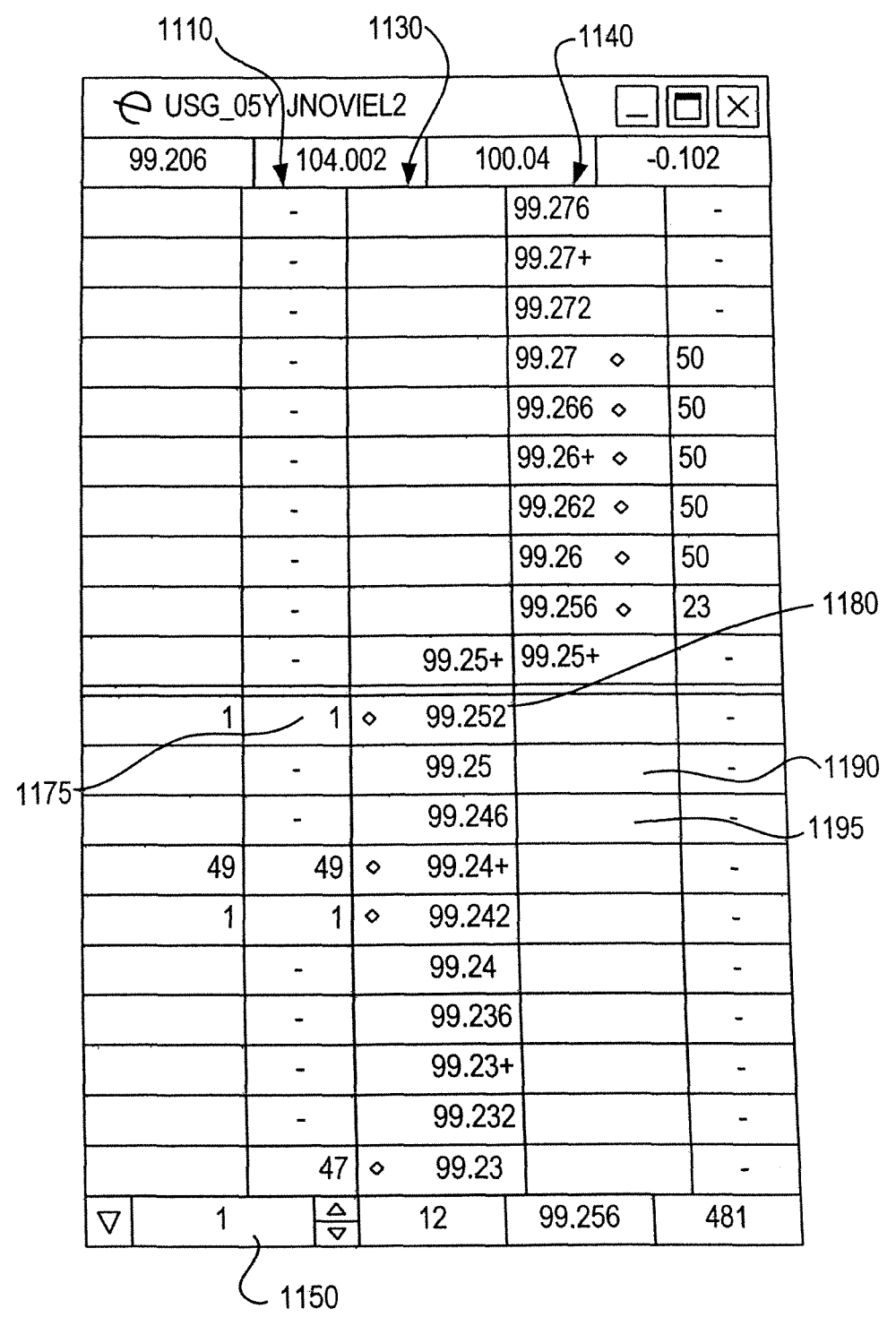

|  | 1110 | 1130 | 1140 | |
|---|---|---|---|---|
| ⊖ USG_05Y JNOVIEL2 | | | _ ☐ ✕ | |
| 99.206 | 104.002 | 100.04 | -0.102 | |
|  | - |  | 99.276 | - |
|  | - |  | 99.27+ | - |
|  | - |  | 99.272 | - |
|  | - |  | 99.27 ◊ | 50 |
|  | - |  | 99.266 ◊ | 50 |
|  | - |  | 99.26+ ◊ | 50 |
|  | - |  | 99.262 ◊ | 50 |
|  | - |  | 99.26 ◊ | 50 |
|  | - |  | 99.256 ◊ | 23 |
|  | - | 99.25+ | 99.25+ | - |
| 1 | 1 ◊ | 99.252 |  | - |
|  | - | 99.25 |  |  |
|  | - | 99.246 |  |  |
| 49 | 49 ◊ | 99.24+ |  | - |
| 1 | 1 ◊ | 99.242 |  | - |
|  | - | 99.24 |  |  |
|  | - | 99.236 |  |  |
|  | - | 99.23+ |  |  |
|  | - | 99.232 |  |  |
|  | 47 ◊ | 99.23 |  | - |
| ▽ 1 | △▽ | 12 | 99.256 | 481 |

| | | 1210 | 1230 | 1240 | 1220 | 1250 | | |
|---|---|---|---|---|---|---|---|---|
| *e* | 4.250 8/14 MONITOR | | | | | ▭ ▯ ✕ | | 1200 |
| - | | 50 | 102.22 ◇ | 13 | | |
| - | | 25 | .21+◇ | 30 | | |
| - | | 25 | .21 ◇ | 16 | | |
| - | | 25 | .20+◇ | 17 | | |
| - | | 25 | .20 ◇ | 42 | | |
| - | | | .19+ | 56 | | |
| - | | 25 | .19 ◇ | 134 | | |
| - | | 1 TAK | .18+ | 93 | | |
| - | | 6 TAK | 101.18 | 12 | 1 | |
| - | | 101.17+ | 101.17+ | - | 1 | |
| 103 | | ◇ .17 | 6 | - | 79 | |
| 75 | | ◇ .16+ | 1 | - | | |
| 27 | | .16 | | - | | |
| 33 | | ◇ .15+ | 4 | - | | |
| 31 | | .15 | | - | | |
| 14 | | .14+ | | - | | |
| 25 | | ◇ .14 | 6 | - | | |
| 12 | | .13+ | | - | | |
| 11 | | .13 | | - | | |
| 10 | | .12+ | | - | | |
| △ | 1 | 6 | 101.17 | | | |

| | ▲▼ | PL: | BEST | 1 | 2 | 3 | NONE |
|---|---|---|---|---|---|---|---|
| CLR | | LMT | | MKT | | | |
| 10 | | 300 | | | CXL BUYS | | |
| 50 | | 500 | | | CXL ALL | | |
| 100 | | 1000 | | | CXL SELLS | | |

*FIG. 12a*

|   |   |   | 1210 | 1230 | 1240 | 1220 | 1250 |   |
|---|---|---|------|------|------|------|------|---|

↙1210  ↙1230  ↙1240  ↙1220  ↙1250

| ℓ | 4.250 8/14 | MONITOR |   | _ | □ | × | ← 1201 |
|---|---|---|---|---|---|---|---|
| - |   |   | 102.22◊ | 50 | 13 |   |   |
| - |   |   | .21+ ◊ | 25 | 30 |   |   |
| - |   |   | .21 ◊ | 25 | 16 |   |   |
| - |   |   | .20+ ◊ | 25 | 17 |   |   |
| - |   |   | .20 ◊ | 25 | 42 |   |   |
| - |   |   | .19+ |   | 56 |   |   |
| - |   |   | .19 ◊ | 25 | 134 |   |   |
| - |   | 1 TAK | .18+ |   | 93 |   |   |
| - |   | 6 TAK | 101.18 |   | 12 |   | 1 |
| - |   | 101.17+ | 101.17+ |   | - |   | 1 |
|   | 103 | 6 | ◊ .17 |   | - |   | 79 |
|   | 75 | 1 | ◊ .16+ |   | - |   |   |
|   | 27 |   | .16 |   | - |   |   |
|   | 33 | 4 | ◊ .15+ |   | - |   |   |
|   | 31 |   | .15 |   | - |   |   |
|   | 14 |   | .14+ |   | - |   |   |
|   | 25 | 6 | ◊ .14 |   | - |   |   |
|   | 12 |   | .13+ |   | - |   |   |
|   | 11 |   | .13 |   | - |   |   |
|   | 10 |   | .12+ |   | - |   |   |
| △ | 1 |   | 6 | 101.17 |   |   |   |

1202 → ; 1280 →

|   |   | ▲▽ | PI: | BEST | 1 | 2 | 3 | NONE |
|---|---|---|---|---|---|---|---|---|
|   | CLR |   |   | LMT |   | MKT |   |   |
|   | 10 |   |   | 300 |   |   | CXL BUYS |   |
|   | 50 |   |   | 500 |   |   | CXL ALL |   |
|   | 100 |   |   | 1000 |   |   | CXL SELLS |   |

*FIG. 12b*

| 1350 | 1330 | 1315 | 1340 | |
|---|---|---|---|---|
| 101.002 | 101.03 | 96.05 | 4.266 | |
| | | - | 101.022 | |
| | | - | 101.02 | |
| | | - | 101.016 | |
| | | - | 101.01+ | |
| | | - | 101.012 | |
| | | - | 101.01 | |
| | | - | 101.006 | |
| 100 | | 100 | 101.00+ | |
| 50 | | 50 | 101.002 | |
| 10 | | 10 | 101.00 | |
| 10 | ◊100.316 | 11 | | |
| 50 | ◊100.31+ | 50 | | |
| | 100.312 | - | | |
| | 100.31 | - | | |
| | 100.306 | - | | |
| | 100.30+ | - | | |
| | 100.302 | - | | |
| | 100.30 | - | | |
| | 100.296 | - | | |
| | 100.29+ | - | | |
| △ 10 ⇅ | 1 | 101.002 | -0- | ⇅ |

| | | PL: | BEST | 1 | 2 | 3 | NONE |
|---|---|---|---|---|---|---|---|
| | ⇅ | CLR | | LMT | MKT | | |
| 10 | | 300 | | | CXL BUYS | | |
| 50 | | 500 | | | CXL ALL | | |
| 100 | | 1000 | | | CXL SELLS | | |

*FIG. 13*

SYSTEMS AND METHODS FOR PROVIDING DYNAMIC PRICE AXES IN FEATURED USER INTERFACES

CROSS-REFERENCES TO RELATED APPLICATIONS

The present application is a National Stage application which claims the benefit of International Application No. PCT/US05/27174, filed Jul. 29, 2005; which claims the benefit of U.S. provisional application No. 60/592,415, filed Jul. 29, 2004; and U.S. provisional application No. 60/629,696, filed Nov. 19, 2004. Each of the aforementioned applications are hereby incorporated by reference herein in their respective entireties.

FIELD OF THE INVENTION

This invention relates to electronic trading systems. More particularly, this invention relates to user interfaces and methods for use with electronic trading systems.

BACKGROUND OF THE INVENTION

Much trading today involves some computer support, from simple information delivery to sophisticated trading systems that automate transactions of goods and services. Electronic trading systems and methods have gained widespread acceptance for trading of a wide variety of items ranging from financial instruments (such as stocks, bonds, currency, futures, options, etc.) to household goods (such as old records, antiques, wines, etc.). As electronic trading becomes more popular, an increasing number of traders are in need of new systems and methods to enter trade commands in a quick, efficient, and accurate manner. In one method of electronic trading, bids and asks are submitted by traders to a trading system, those bids and asks are then displayed by the trading system to other traders, and the other traders may then respond to the bids and asks by submitting sell (or hit) or buy (or take) commands to the system.

Some implementations of such systems and methods of electronic trading show a bid column, an ask column and a single price axis. Bid and ask quantities are associated with their respective prices which are displayed in standard increments. While straightforward, this approach fails to unambiguously convey the inside market to a user, especially when a trading interface displays static price axes. This is because the user's attention is drawn to changes in quantity rather than changes in price. Moreover, this approach fails to show trade activity that was occurring in real-time.

Furthermore, market conditions change quickly as trades are executed at a fast pace. Price positions may therefore change rapidly and sometimes almost simultaneously. Users of such systems therefore face the risk of entering trade commands at erroneous price levels by, for example, using a pointer to select a price that may have changed by the time the command is registered by the system. Such erroneous entries can lead to highly undesirable results in a rapidly changing market. Many such users are traders that track more than one active market by typically looking at multiple windows, interfaces or screens simultaneously, thereby increasing the likelyhood that such erroneous entries occur.

Therefore, it would be desirable to provide systems and methods that clearly represent price fluctuations while ensuring quick, accurate and efficient execution of trades.

It would also be desirable to provide a user interface for electronic trading that is intuitive whereby the inside market is represented to the user by a dynamic display of the bid/ask prices and their associated quantities.

It would also be desirable to adjust the display of the bid/ask prices and their associated quantities while maintaining accurate and accessible axes for order entry at desired price levels.

It would also be desirable to provide users with an opportunity to customize the user interface according to their trading preferences.

It would also be desirable to enable users to manipulate the user interface using any suitable input device.

It would also be desirable to display trade activity occurring in real-time.

It would also be desirable to display trade orders that have not yet been accepted or rejected in real-time.

SUMMARY OF THE INVENTION

Therefore, it is an object of the invention to provide systems and methods that clearly represent price fluctuations while ensuring quick, accurate and efficient execution of trades.

It is another object of the invention to provide a user interface for electronic trading that is intuitive whereby the inside market is represented to the user by a dynamic display of the bid/ask prices and their associated quantities.

It is yet another object of the invention to adjust the display of the bid/ask prices and their associated quantities while maintaining accurate and accessible axes for order entry at desired price levels.

It is yet another object of the invention to provide users with an opportunity to customize the user interface according to their trading preferences.

It is yet another object of the invention to enable users to manipulate the user interface using any suitable input device.

It is yet another object of the invention to display trade activity occurring in real-time alongside corresponding axes.

It is yet another object of the invention to display trade orders that have not yet been accepted or rejected in real-time alongside corresponding axes.

These and other objects are accomplished in accordance with the principles of the invention by providing systems and methods for displaying market information for, and allowing for electronic trading in, items through a user interface. More specifically, some embodiments of the invention provide an interface for use with an electronic trading system that includes a dynamic display of prices. The interface provides a display of bid prices and ask prices, preferably along different axes. The interface may provide at least one axis for displaying size information. In some embodiments of the invention, the interface provides a bid size axis and an ask size axis. The interface also provides an indication of the inside market—i.e., the best (highest) bid and best (lowest) ask prices for which size exists—which may be centered within the interface. When the inside market changes in response to changing market conditions, at least one of the prices changes locations between the bid price axis and the ask price axis. The prices, as well as different sizes—such as the size of in-transit orders, the size of completed trades, the user's share of the total size—may be displayed in different ways. The user may use an input device to enter bid, ask, buy and sell orders and modify them before submission. Order entry regions may be displayed to the user to facilitate order submission.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 4 is an illustration of another alternative embodiment of an exemplary interactive display that may be displayed to users in accordance with certain embodiments of the present invention;

FIGS. 5A-5B are illustrations of yet other alternative embodiments of exemplary interactive displays that may be displayed to users in accordance with certain embodiments of the present invention;

FIGS. 6A-6D are illustrations of yet other alternative embodiments of exemplary interactive displays that may be displayed to users in accordance with certain embodiments of the present invention;

FIGS. 11A-11C are illustrations of yet other alternative embodiments of exemplary interactive displays and an exemplary display window that may be displayed to users in accordance with certain embodiments of the present invention;

FIGS. 12A-12B are illustrations of yet other alternative embodiments of exemplary interactive displays that may be displayed to users in accordance with certain embodiments of the present invention;

FIG. 13 is an illustration of yet another alternative embodiment of an exemplary interactive display that may be displayed to users in accordance with certain embodiments of the present invention.

DETAILED DESCRIPTION OF THE INVENTION

The invention is directed to systems and methods that provide a trading interface that displays market information showing greater levels of movement and trade activity than prior art systems and methods, and that have added functionality, are easier to use and more intuitive compared to prior art systems and methods. The invention is also directed to user input devices for receiving user input. More particularly, the invention relates to customizable interfaces and input devices having arrangements, labels, colorization, programmed functionalities, and the like, that allows any user—e.g., a broker, a trader or any other market participant—to view market activity such as bids and asks or offers placed on particular items, and enter, execute and view trades intuitively, quickly and accurately. A bid may include a bid price—i.e., a dollar amount proposed to buy an issue or item—and a bid size—i.e., the volume of the particular bid. Similarly, an ask or offer may include an ask or offer price—i.e., a dollar amount proposed to sell an issue or item—and an ask or offer size—i.e., the volume of the particular ask or offer.

Further details of the invention are described below in relation to FIGS. 1-13.

Figure 1:
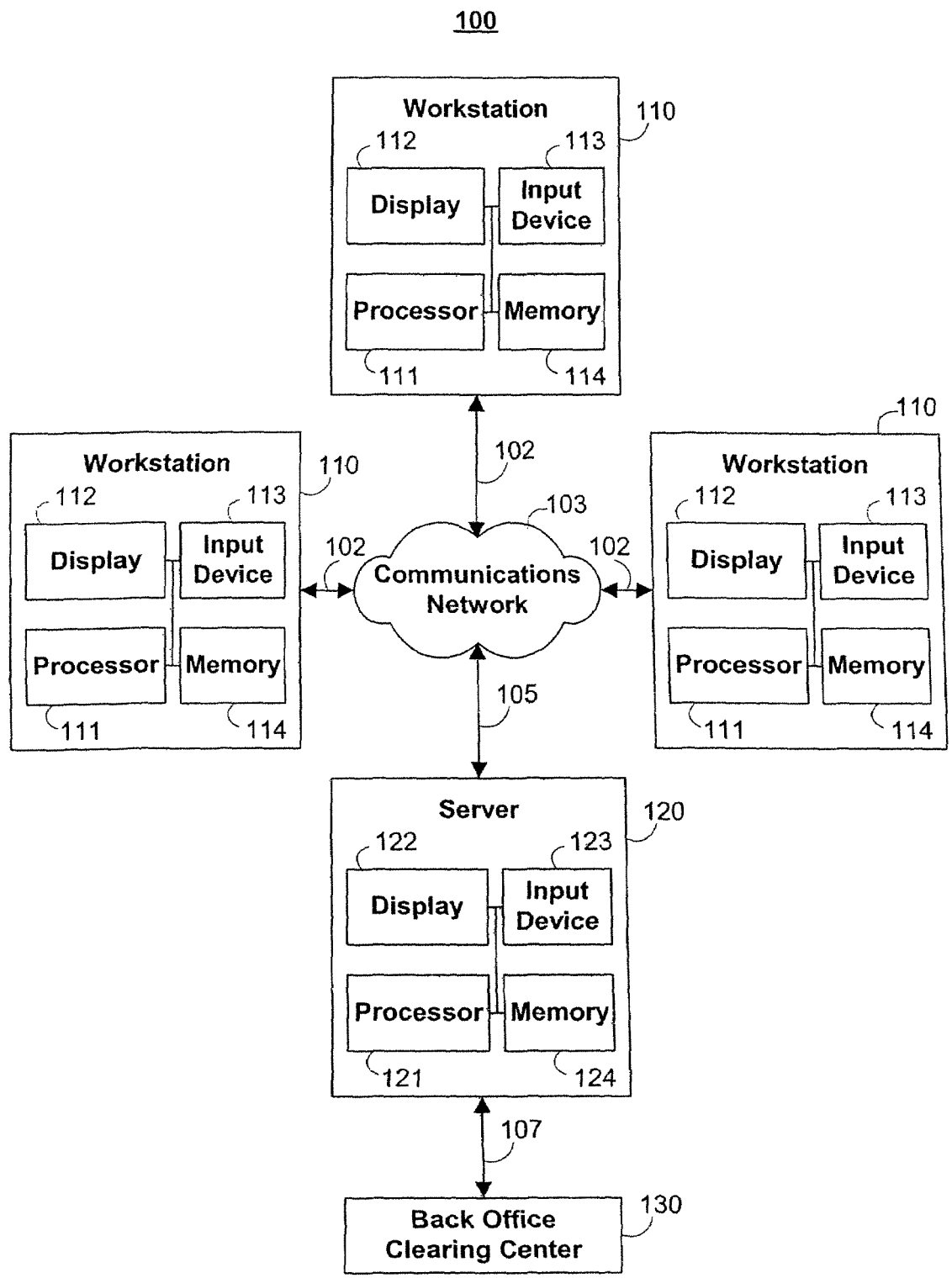
FIG. 1 is a block diagram of an exemplary system that may be used to implement the processes and functions of certain embodiments of the present invention.

Referring to FIG. 1, exemplary system 100 for implementing the invention is shown. As illustrated, system 100 may include one or more workstations 110. Workstations 110 may be local or remote, and are connected by one or more communications links 102 to computer network 103 that is linked via communications link 105 to server 120. Server 120 may be linked to back office clearing center 130 via communications link 107.

Server 120 may be any suitable server, processor, computer, data processing device, or combination of the same. Server 120 may be used to implement the governing logic that processes and executes orders and trades, and distributes trade and market information, including price and size information, to workstations 110. Computer network 103 preferably includes the Internet but may consist of any suitable computer network such as an intranet, a wide-area network (WAN), a local-area network (LAN), a wireless network, a digital subscriber line (DSL) network, a frame relay network, an asynchronous transfer mode (ATM) network, a virtual private network (VPN), or any combination of the same. Communications links 102 and 105 may be any communications links suitable for communicating data between workstations 110 and server 120, such as network links, dial-up links, wireless links, hard-wired links, etc.

Workstations 110 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 110 may be used by participants to enter bid, ask, buy and sell orders for the items being traded and view market activity corresponding to these items.

A typical workstation 110 may include processor 111, display 112, input device 113, and memory 114, which may be interconnected. In a preferred embodiment, memory 114 includes a storage device for storing a workstation program for controlling processor 111. Memory 114 may also store user configuration files, as described below, and other data on the storage device. The workstation program may include a trading application for running the trading interfaces shown in FIGS. 2-13 and displayed on display 112. Input device 113 may be used in conjunction with display 112 by users to enter bids/asks on desired items and to execute and monitor trades. Processor 111 may use the workstation program to receive trade information relating to the items being traded by multiple users of system 100, or other users, and display such information on display 112 or communicate such information to display 112.

Server 120 may include processor 121, display 122, input device 123, and memory 124, which may be interconnected. In a preferred embodiment, memory 124 includes a storage device for storing a server program that provides the governing logic for controlling processor 121. Memory 124 may also store firm-wide configuration files, as described below, and other data on the storage device. Processor 121 may use the server program to process orders and execute trades communicated from various workstations that are operated by multiple users of system 100, or other users, and communicate trade information, as well as bid and ask information, to workstations 110 and back office clearing center 130. More specifically, processor 121 may use the server program to process orders placed by users in response to users entering commands using input device(s) 113, and execute trades based on such orders, whenever applicable.

Back office clearing center 130 may be any suitable equipment, such as a computer, a laptop computer, a mainframe computer, etc., or any combination of the same, for causing trades to be settled and/or verifying that trades are settled. Communications link 107 may be any communications links suitable for communicating data between server 120 and back office clearing center 130, such as network links, dial-up links, wireless links, hard-wired links, etc.

FIGS. 2-13 illustrate user interfaces that may be implemented by and displayed on system 100 of FIG. 1, in accordance with the principles of the invention. For example, FIGS. 2-13 illustrate interactive displays and portions thereof that may be shown on display 112 and manipulated using input device 113.

Figure 2A:
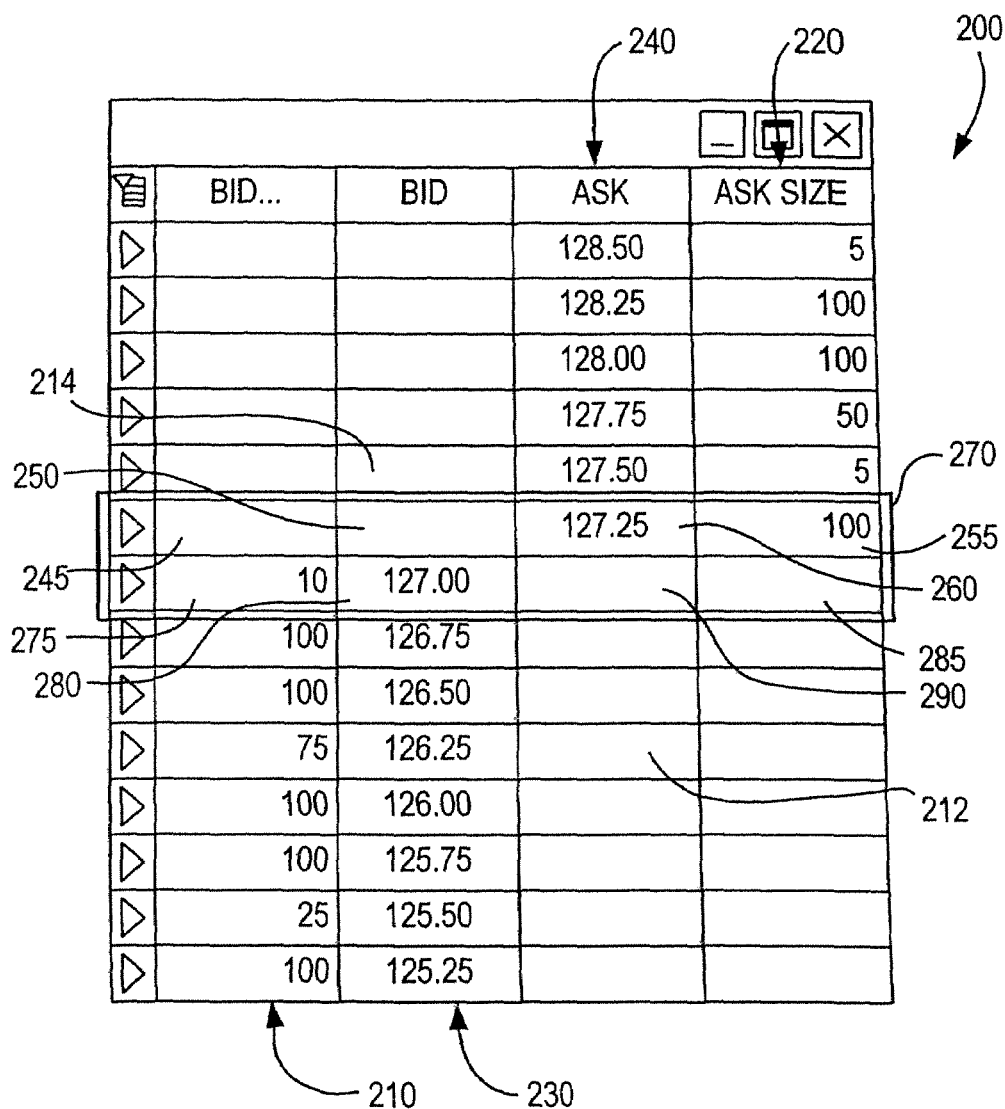
FIGS. 2A-2B are illustrations of exemplary interactive displays that may be displayed to users in accordance with certain embodiments of the present invention.

FIG. 2A shows an interactive display 200 according to the invention that may be associated with electronic trading of financial instruments, such as interest-rate-related instruments, derivates thereof, or any other instruments and/or items. FIG. 2A shows interactive display 200 of a market at a particular time. While FIG. 2A shows multiple vertical axes or columns, it should be noted that the scope of the invention includes axes in horizontal directions, any other suitable axes or any other suitable display regions. Interactive display 200 preferably includes a bid size column 210 on a first axis, an ask size column 220 on a second axis, a bid price column 230 on a third axis and an ask price column 240 on a fourth axis. Bid price column 230 and bid size column 210 represent the bid side of interface 200 while ask price column 240 and ask size column 220 represent the ask side of interface 200. Bid size column 210 preferably displays the size of bids available at the corresponding price shown in bid price column 230, while ask size column 220 preferably displays the size of asks available at the corresponding price shown in the ask price column 240. A visual indicator may be used to accentuate the difference between columns associated with bids and asks. For example, bid size column 210 and/or bid price column 230 may be colored differently than ask size column 220 and/or ask price column 240.

An indication of the inside market is shown by the boxed area at 270. The inside market may include bid size 10, available at best bid price 127.00, and ask size 100, available at best ask price 127.25. Boxed area 270 preferably displays the inside market on interactive display 200, thereby emphasizing the best bid and best ask. Area 270 may be highlighted or its edges colored. While area 270 is indicated by a box, the indication may be provided using a reverse highlighting of the inside market or other suitable visual indicator or method, such as displaying the best prices and corresponding sizes in an underlined, italicized and/or bold fashion and/or using a unique or different font or font size.

Bid/ask price columns 230 and 240 may display prices according to fixed increments. For example, the prices in interactive display 200 are shown in 0.25 increments. Alternatively, in some embodiments of the invention, the price increments that are displayed may be specified by the user. For example, a user may specify that the prices other than the best bid and offer prices in interactive display 200 be shown in 0.50 increments instead. In such a situation, rows containing best price levels 127.00 and 127.25 may be displayed whereas rows containing price levels 127.75, 128.25, 126.75, 126.25, etc. may not be displayed, thereby providing more display space for displaying a wider range of price levels. In markets that allow users to trade at price levels corresponding to non-standard price increments, all price levels having corresponding sizes being bid or asked may be displayed subject to the user's preferences, as discussed below. See, e.g., FIGS. 5A and 5B as well as corresponding descriptions.

Figure 12C:
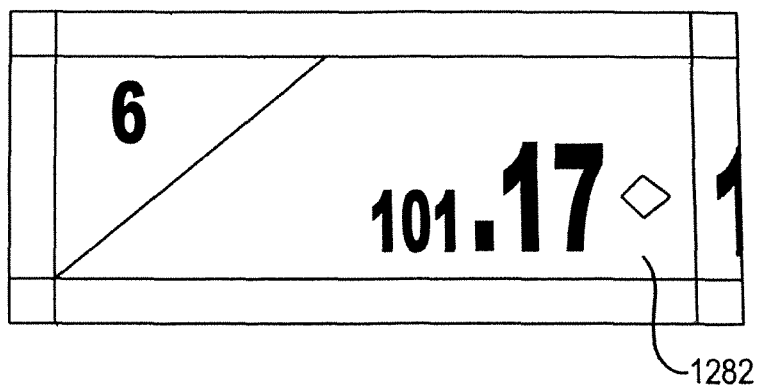
FIGS. 12C-12D are illustrations of alternative embodiments of exemplary cells of interactive displays that may be displayed to users in accordance with certain embodiments of the present invention.
Figure 12D:
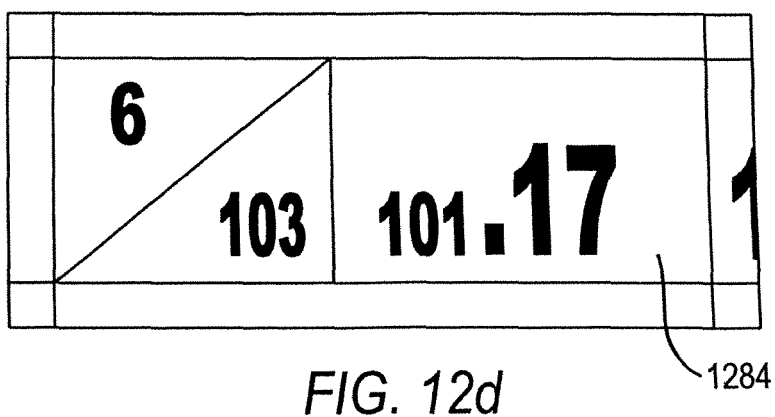

Other embodiments of the invention that allow for more display space are shown in FIGS. 4, 12D and 13. Referring to FIG. 4, interactive display 400 may crop prices by displaying price handles when necessary to distinguish a change in the handle. The handle refers to the numerical character to the left of a decimal point. For example, rows 412 through 418 do not display the price handle 101 for the price levels in ask price column 440 falling between price 101.18 in row 411 and price 102.22 in row 419. The same is similarly true for the price levels displayed in bid price column 430. It can be deduced that the handle at each price level in these columns is 101 in this case, with the exception of the ask price in row 419. The ask price in row 419 shows handle 102 to illustrate that the price level in row 419 is not a sequential price change from the price level in row 418.

The handle may also appear in the cell within the ask price column that corresponds to a sequential price increase from a price level at the highest possible increment for that level to the next price level. Similarly, the handle may also appear in the cell within the bid price column that corresponds to a sequential price decrease from a price level at the lowest possible increment for that level to the previous price level. At least one price handle should be displayed in a price axis to provide a frame of reference.

Interactive display 400 may also display price handles in a row containing a bid that is being hit—i.e., accepted. Interactive display 400 may also or alternatively display price handles in a row containing an ask that is being taken—i.e., accepted—e.g., row 411. Interactive display 400 may also or alternatively display price handles in a row containing a locked market—i.e., one where the best bid price is equal to the best ask price—e.g., row 410—or in any other row for any appropriate reason. In alternative embodiments of the invention, price handles may be displayed using a font of size smaller than the one used to display the number that lies to the right of the decimal point in certain rows, or in all rows, as shown in, for example, FIGS. 12C and 12D.

Figure 5B:
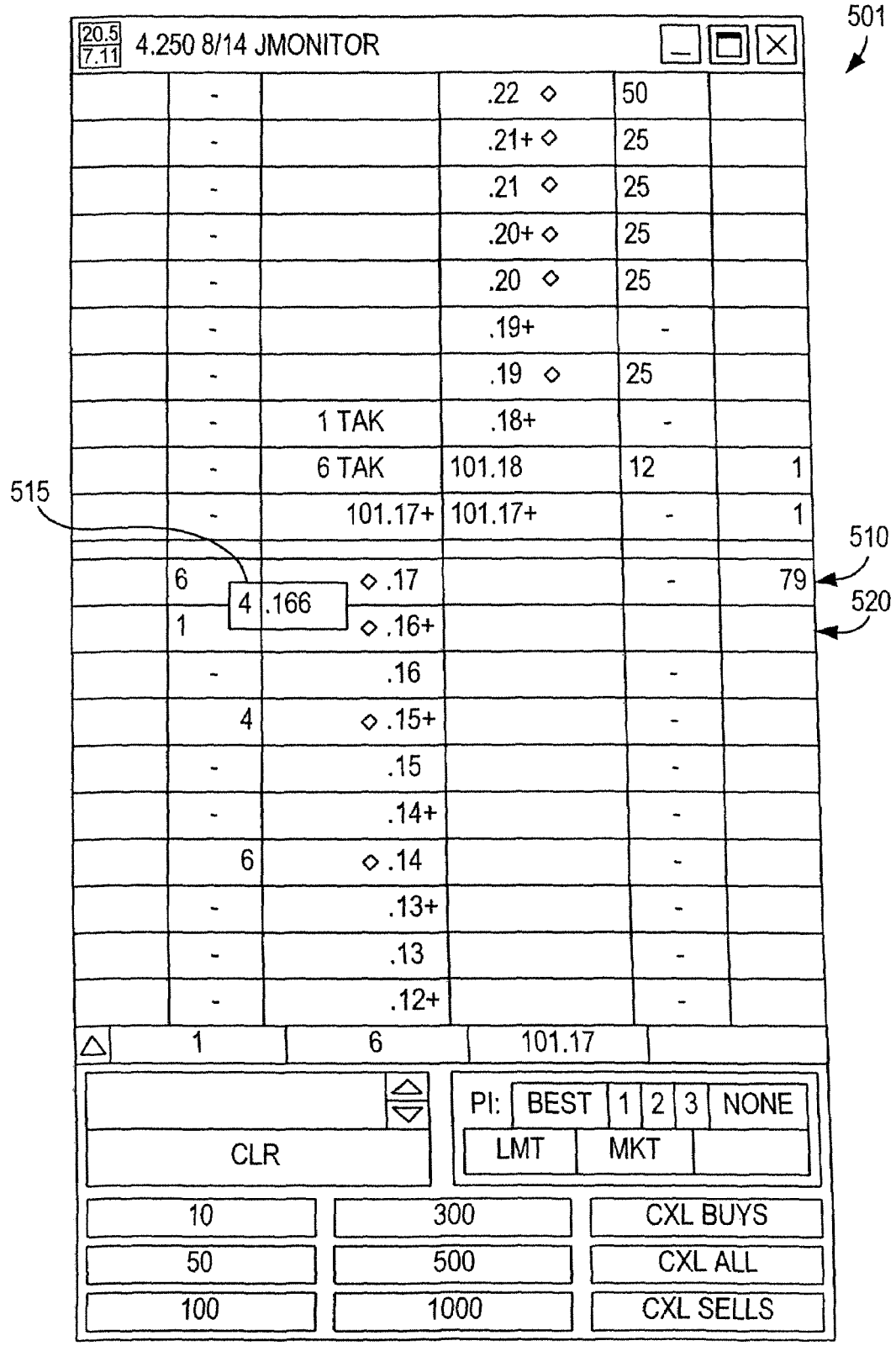

Accordingly, not only do these embodiments that include selectively or differently displaying the price handle make it easier for a user viewing the display to distinguish price changes, they also provide additional display space for displaying other useful information, such as price levels at non-standard price increments, as shown in FIG. 5B, and the user's share of the size, as shown in FIGS. 12A-12D.

A user may customize the display such that selected rows surrounding the inside market display price levels that are separated by the smallest possible price increments. In this situation, price levels at all available increments may be displayed in the selected cells. Similarly, a user may customize the display such that cells displaying less favorable prices display price levels that are separated by larger price increments. Alternatively, the user may specify that cells displaying prices in particular ranges be associated with, and therefore display, certain price increments.

The system or user may define a window specifying a number of rows, or a range of prices, above and/or below the best bid/ask in which all price levels are displayed. In this situation, price levels at all available, or user-specified, increments may be displayed in that window, regardless of whether a pending bid or ask at a given price level exists. A row containing a price level at which no size is bid nor asked may display a zero, a "-" symbol or may not display anything at all—i.e., not displaying any number, character or symbol "-" in the corresponding cell in the bid and ask size columns, the bid and ask price columns, or both. The rows below and above the user-defined window may only display prices at which corresponding bid and ask sizes exist.

Instead of not being displayed at all, rows containing price levels that do not correspond to an increment desired by a user and/or rows containing price levels at which no size is bid nor asked may alternatively be displayed in another fashion. For example, FIG. 5A shows interactive display 500 in which row 510, which shows a size of 10 bid at price 101.172 corresponding to a non-standard price increment, is displayed in a reduced-size fashion and may or may not be displayed out of vertical alignment with bid prices in the same column. Likewise, row 530 of interactive display 500 shows a size of 2 asked at price 101.182 corresponding to a non-standard price increment displayed in a reduced-size fashion. In another example, FIG. 5B shows interactive display 501 in which a row falling between rows 510 and 520 is displayed in single cell 515, which shows a size of 4 bid at price 101.166, corresponding to a non-standard price increment. The interactive displays of FIGS. 5A and 5B may therefore be used to indicate to users the existence of price levels corresponding to non-standard price increments. In other embodiments of the invention, such rows may be displayed in a contracted or collapsed fashion, similar to the rows that can be seen in the figures corresponding to the following description.

As shown in FIGS. 6A-6D, rows displayed in the interactive display may have variable dimensions, such as heights and widths. FIGS. 6A-6D show interactive displays 600, 601, 602 and 603 which may include rows that are collapsed, such as rows 610, 620, 630 and 640. These rows may be denoted by visual indicators which may be clicked using a pointing device such as a mouse, or any other input device, in order to expand them—i.e., such that they may be displayed in the same manner the other rows are displayed. The visual indicator may include up/down arrows, may be a "+" symbol—e.g., indicators 611, 621, 631 and 641—or may be any other appropriate indicator. Each expanded row may be collapsed by clicking on a particular portion, such as the side or edge of the row, or any other appropriate portion of the row that, for example, does not include a numerical value, or through any other appropriate action.

Interactive displays 600, 601, 602 and 603 may be customized to display certain rows in an expanded fashion while displaying others in a collapsed fashion. For example, rows containing prices that do not correspond to an increment desired by the user and/or rows containing prices at which no size is bid nor asked may be collapsed by default—i.e., when the user launches the interactive display. Alternatively, the user may customize the display to show expanded rows close to the ones showing the inside market, while showing collapsed rows above and below the inside market. For example, when the user defines, or the system sets by default, a window specifying a number of rows, or a range of prices, above and below the best bid/ask in which all prices are displayed, collapsed rows may be displayed outside that window. In this example, collapsed rows 610 and 640, when expanded, may be used to display a volume-weighted average price for all remaining prices outside the user-defined window. Alternatively, in some embodiments of the invention, collapsed rows 610 and 640, when expanded, may be used to display the next available price at which some size is bid and asked, the worst price at which the user may trade all remaining available size or any other price outside the user-defined window. The rows within the range may be collapsed by clicking on them. When collapsed, such rows may be expanded by clicking on them or on any other suitable portion displaying information related to the instrument being traded, such as a window displaying a chart that shows prices at which the instrument is trading.

In some embodiments of the invention, multiple collapsed rows may be used to denote that a particular range of prices exist between nonconsecutive price levels. These rows may be displayed in a collapsed fashion by default—i.e., when the user launches the interactive display—because no size exists as a bid or ask in the particular price range, because the particular price range is significantly removed from the inside market, because the particular price range is outside the user-defined window, for any combination of these reasons, or for any other appropriate reason.

In some embodiments of the invention, no more than two collapsed rows that are adjacent to each other may be displayed at the same time in an interactive display, regardless of how many price levels may exist. For example, FIGS. 6A-6D show two collapsed rows between prices 101.13+ and 101.15+ that may be expanded. These collapsed rows indicate the existence of at least two price levels between 101.13+ and 101.15+. Once expanded, the top collapsed row may display the next price increment below the currently expanded price level. Similarly, once expanded, the bottom collapsed row may display the next price increment above the currently expanded price level. Clicking indicator 621 expands row 620 of FIG. 6A into row 625 of FIG. 6B, thereby displaying price 101.15 below price 101.15+. After row 620 is expanded, two collapsed rows 630 and 650 are displayed between prices 101.13+ and 101.15 because more than one price level remains undisplayed. Similarly, clicking indicator 631 expands row 630 of FIGS. 6A and 6B into row 635 of FIG. 6C, thereby displaying price 101.14 above price 101.13+. After rows 620 and 630 are expanded, one collapsed row 650 is displayed between prices 101.15 and 101.14 because a single price level remains undisplayed. Clicking indicator 651 expands row 650 of FIGS. 6B and 6C into row 655 of FIG. 6D, thereby displaying price 101.14+ between prices 101.14 and 101.15. When rows 620, 630 and 650 are expanded, no collapsed row is displayed because all price levels will have been expanded.

In other embodiments of the invention, a single collapsed row may be used to denote the existence of a particular range of prices between nonconsecutive price levels. Depending on what portion of the row is clicked, an expanded row showing the next price increment may be displayed either below or above the nearest row already displaying an available price. A single collapsed row may remain displayed between nonconsecutive price levels until all price levels are displayed. Alternatively, in some embodiments of the invention, any number of collapsed rows may be displayed, including a number corresponding to the number of undisplayed price levels, to denote the existence of a particular range of price levels between nonconsecutive price levels.

In some embodiments of the invention, interactive display 200 preferably shows a change in the inside market as follows. When an ask for a particular price is matched—e.g., the 100 asked at 127.25 are bought, and an additional size—e.g., 50—is bid at 127.25, then the following changes to the display are implemented: Cell 250 is temporarily populated with the size that is bought—i.e., 100—while an indicator displaying the word TAK is temporarily displayed (see, e.g., FIG. 4, row 411). Cell 250 is then populated with the new best bid price—i.e., 127.25—while cell 245 is populated with the new best bid size—i.e., 50—and cells 255 and 260 are preferably depopulated. The indicator displaying the word TAK may be a blinking indicator, an indicator of varying degrees of intensity or any other appropriate visual indicator.

Figure 2B:
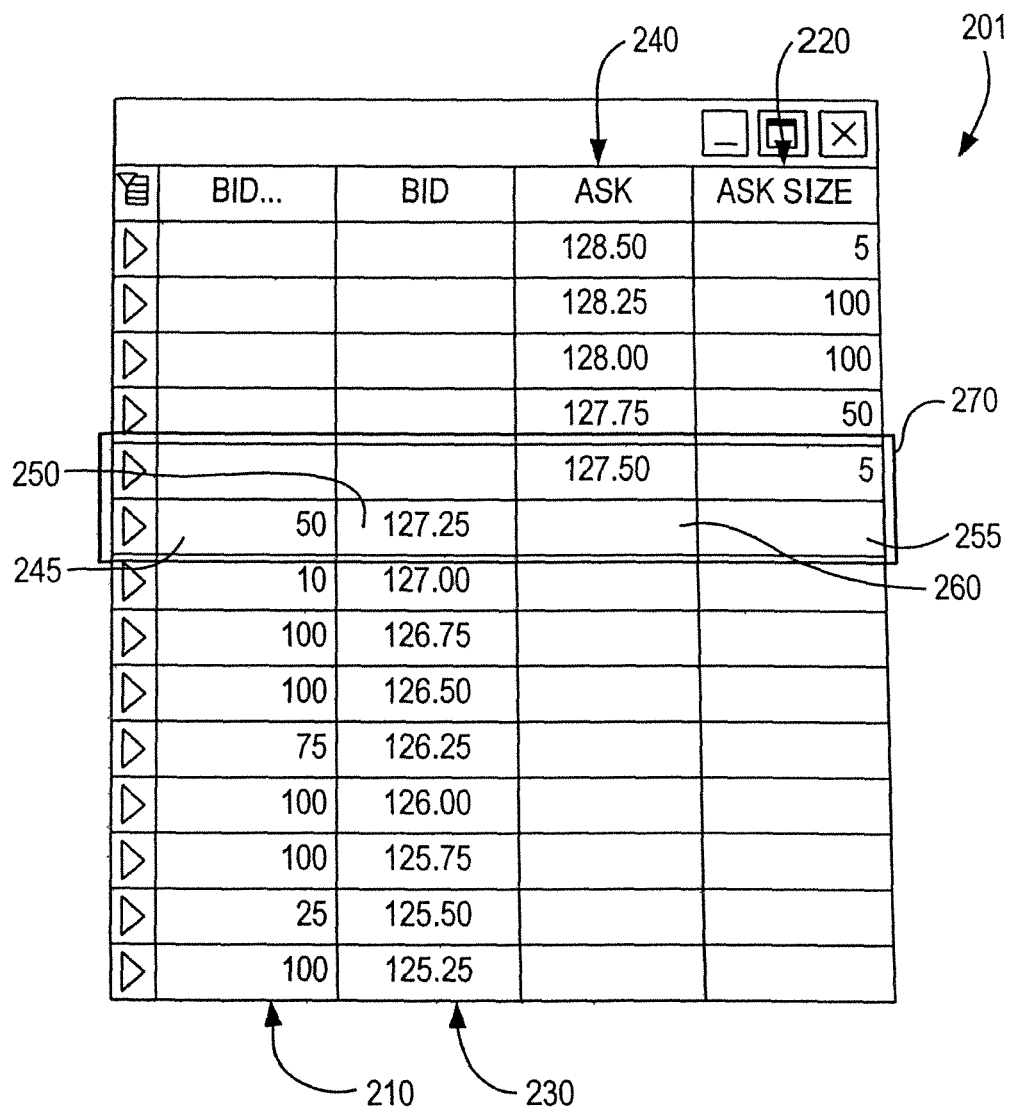

Interactive display 201 of FIG. 2B shows the market of FIG. 2A at a later time, particularly illustrating the net effect on changes in the display of the inside market in response to the exemplary change in market conditions enumerated above. Interactive display 201 shows cell 245 populated with a size of 50, cell 250 populated with a price of 127.25, and cells 255 and 260 depopulated. It should be noted that one of the unpopulated cells in bid price column 230 has been populated while one of the populated cells in ask price column 240 has been depopulated. It should also be noted that the price previously displayed as the best bid—i.e., 127.25—has changed positions from cell 260 to cell 250 in response to changing market conditions. Accordingly, a portion of the inside market has migrated from one column to another. An indication of the change of locations of the portion of the inside market may be displayed. For example, the interactive display may illustrate the movement of the price 127.25 from being the best ask price in cell 260 to becoming the best bid price in cell 250. Moreover, when the best bid and/or best ask prices change, the graphic display of the inside market also changes to clearly show spatial movement—i.e., a location change on the display—of the size(s) of the inside market as well as the representative price(s) associated therewith.

Thus, in the example discussed above, both bid price column 230 and ask price column 240 have changed whereby the sizes of the inside market and their positions in the display, as well as the representative prices associated therewith have changed in response to changing market conditions. Both price columns 230 and 240 are therefore dynamic in that both may change based on changing market conditions. More specifically, both price columns 230 and 240 change based on a change in the inside market. The changes in the price columns may be characterized by a change in the location of a displayed price from one column to the other. The changes may also be characterized by a decrease in the number of populated cells that are displayed in one column and a corresponding increase in the number of populated cells that are displayed in the other column. Moreover, the position on the display, may also change based on such changes in market conditions.

Thus, it can be seen that, unlike other systems that use a common static price axis, some embodiments of the current systems use dual dynamic price axes.

Referring back to FIG. 2A, when a bid for a particular price is matched—e.g., the 10 bid at 127.00 are sold, and an additional size—e.g., 5—is asked at 127.00—then the following changes to the display are implemented: Cell 290 is temporarily populated with the size that is bought—i.e., 10—while an indicator displaying the word HIT is temporarily displayed (see, e.g., FIG. 3B, cell 390). Cell 290 is then populated with the new best ask price—i.e., 127.00—while cell 285 is populated with the new best ask size—i.e., 5—and cells 275 and 280 are preferably depopulated. The indicator displaying the word HIT may be a blinking indicator, an indicator of varying degrees of intensity or any other appropriate visual indicator.

If, on the other hand, a bid for a particular price is not entirely matched—e.g., 8 of 10 bid at 127.00 are sold—then the following changes to the display would be implemented: Cell 290 is temporarily populated with the size that is bought—i.e., 8—while an indicator displaying the word HIT is temporarily displayed. The bid size in cell 275 is adjusted to display the remaining size that was not hit—i.e., 2. The indicator displaying the word HIT may be a blinking indicator, an indicator of varying degrees of intensity or any other appropriate visual indicator.

Similarly, if an ask for a particular price is not entirely matched—e.g., 50 of 100 asked at 127.25 are bought—then the following changes to the display would be implemented: Cell 250 is temporarily populated with the size that is bought—i.e., 50—while an indicator displaying the word TAK is temporarily displayed. The ask size in cell 255 is adjusted to display the remaining size that was not taken—i.e., 50. The indicator displaying the word TAK may be a blinking indicator, an indicator of varying degrees of intensity or any other appropriate visual indicator The foregoing discusses trading systems implementing trading applications that display different embodiments of an interface that shows entered orders and completed trades to users of the trading system. The size of all orders may be displayed and adjusted in real-time in response to marketplace activity. In other embodiments of the invention, the trading application may also allow users submitting trade orders, or alternatively all users, to see the orders that were submitted before they are accepted (or rejected) by the system. For the purposes of this invention, such orders may include bid and ask orders as well as orders to cancel such bids and asks, and may be referred to as in-transit orders.

In such embodiments, each size column may display at least two numbers: one denoting the size that was already accepted by the system, and one denoting the size of the in-transit order entered by a user or a plurality of users. Moreover, the size of an in-transit order may be displayed such that it is broken down according to which user entered the order, when or how the order was entered, or according to any appropriate classification. Alternatively, in some embodiments of the invention, the at least two numbers may be combined and a visual indicator may be used to indicate that the total size that is displayed includes a size corresponding to an in-transit order. For example, a total size that includes an order that is yet to be accepted may be color-coded differently from one illustrating a size that has been entirely accepted. In some embodiments, the constituent elements of the number illustrating the total size may be displayed when a user takes a certain action, such as moving the mouse pointer over a cell displaying the total size.

Typically, in conventional trading systems, users enter their respective commands by typing the price and size in particular fields on an interactive display. Interactive trading according to the invention may be implemented as follows. If a user desired to hit the market shown in cells 275 and 280 of FIG. 2A, then the user could use input device 113 of FIG. 1 to enter an order by clicking on unpopulated cell 290 or 285 in display 112 of FIG. 1—i.e., the corresponding unpopulated cells in the same row on the ask side of the interface. Alternatively, if the user desired to take the market shown in cells 255 and 260, then the user could click on unpopulated cell 250 or 245—i.e., the corresponding unpopulated bid cells in the same row on the bid side of the interface. Similarly, a user may place bid and ask orders by clicking on the corresponding bid or ask cell displaying the price at which the user may want to place the bid/ask. The user may set a default size that he or she may subsequently alter using any appropriate method, such that each time the user enters an order at a selected price, the order is entered for the default size unless the user changes it.

Alternatively, if a user is utilizing a mouse having two buttons—e.g., a left click button and a right click button—the user may use one of the buttons to enter an order for a default size or use the other button to enter another size—e.g., a different default size—or choose a size, price, order type, or any combination of the same from a display window, dialog box, popup menu, toolbar, pane, command line or any other suitable trading interface. Moreover, if the user is utilizing a mouse having scrolling capabilities, such as a wheel, the user may increase or decrease the default size by desired increments using the mouse wheel. In some embodiments of the invention, whether the user clicks on a cell in a bid column or an ask column may determine whether the user is bidding, asking, buying or selling. In alternative embodiments of the invention, a right click may be associated with an order to hit (sell) or ask (place an order to sell) whereas a left click may be associated with an order to take (buy) or bid (place an order to buy), and vice versa. Input device 113 of FIG. 1 may be a mouse, a trackball, a game controller, a touch pad, a keyboard, any combination of the same or any suitable input device(s) that the user may use to enter orders.

The unpopulated cells in the bid price, bid size, ask price and/or ask size columns may alternatively be used to implement and display a suitable order of any type at the corresponding price displayed on the same row in which the cell is located. Examples of suitable orders include a hit/take all order, a stop order and/or a market if touched order.

For example, if a user desired to hit the entire market that is available at a price of 126.25 as displayed in FIG. 2A, the user could click on unpopulated cell 212 in the ask price column corresponding to the bid price displayed in column 230. In this situation, the market shown in cell 275 as well as the market shown in each of the three rows below cell 275 would be hit and a total size of 285 would be sold by the user at the 126.25 price. As another example, if the user desired to take the entire market that is available at a price of 127.50 as displayed in FIG. 2A, the user could click on unpopulated cell 214 in the price column corresponding to the ask price displayed in column 240. In this situation, the market shown in cell 260 as well as the market shown in the row above cell 260 would be taken and a total size of 105 would be bought by the user at the 127.50 price. The user may set an order type to be used as the default order type whenever any of the unpopulated cells are clicked.

Figure 3A:
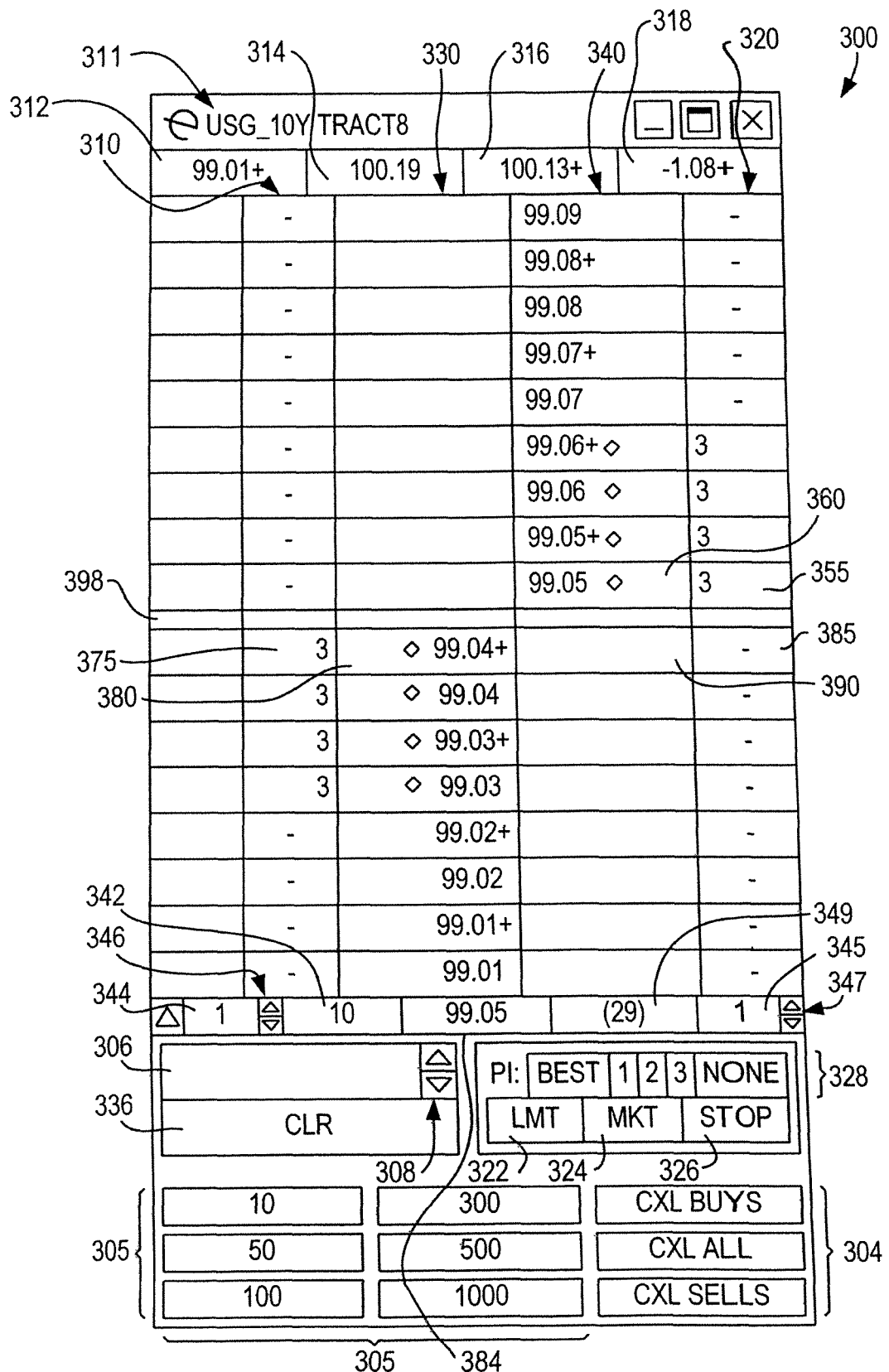
FIGS. 3A-3C are illustrations of alternative embodiments of exemplary interactive displays that may be displayed to users in accordance with certain embodiments of the present invention.
Figure 3B:
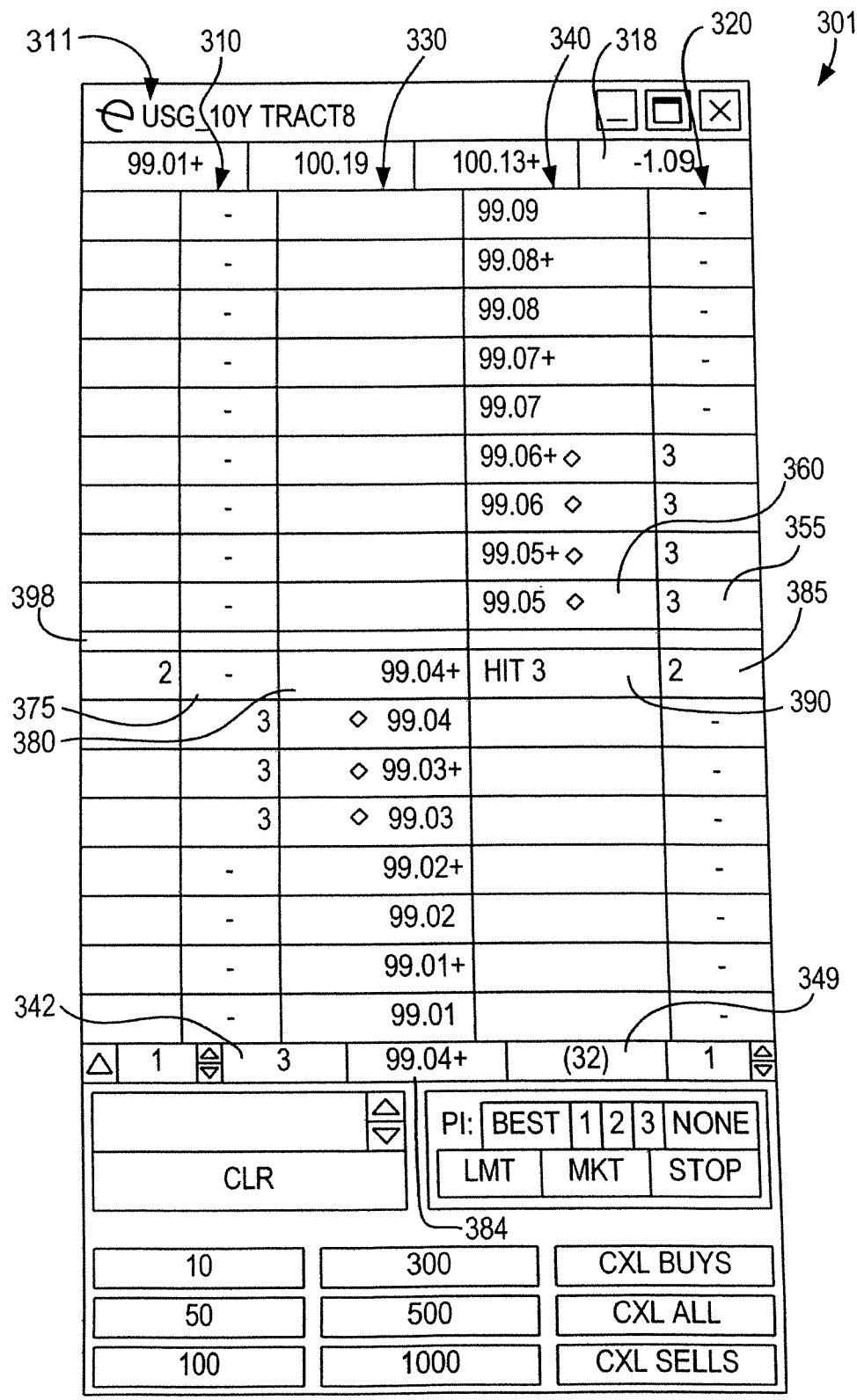
Figure 3C:
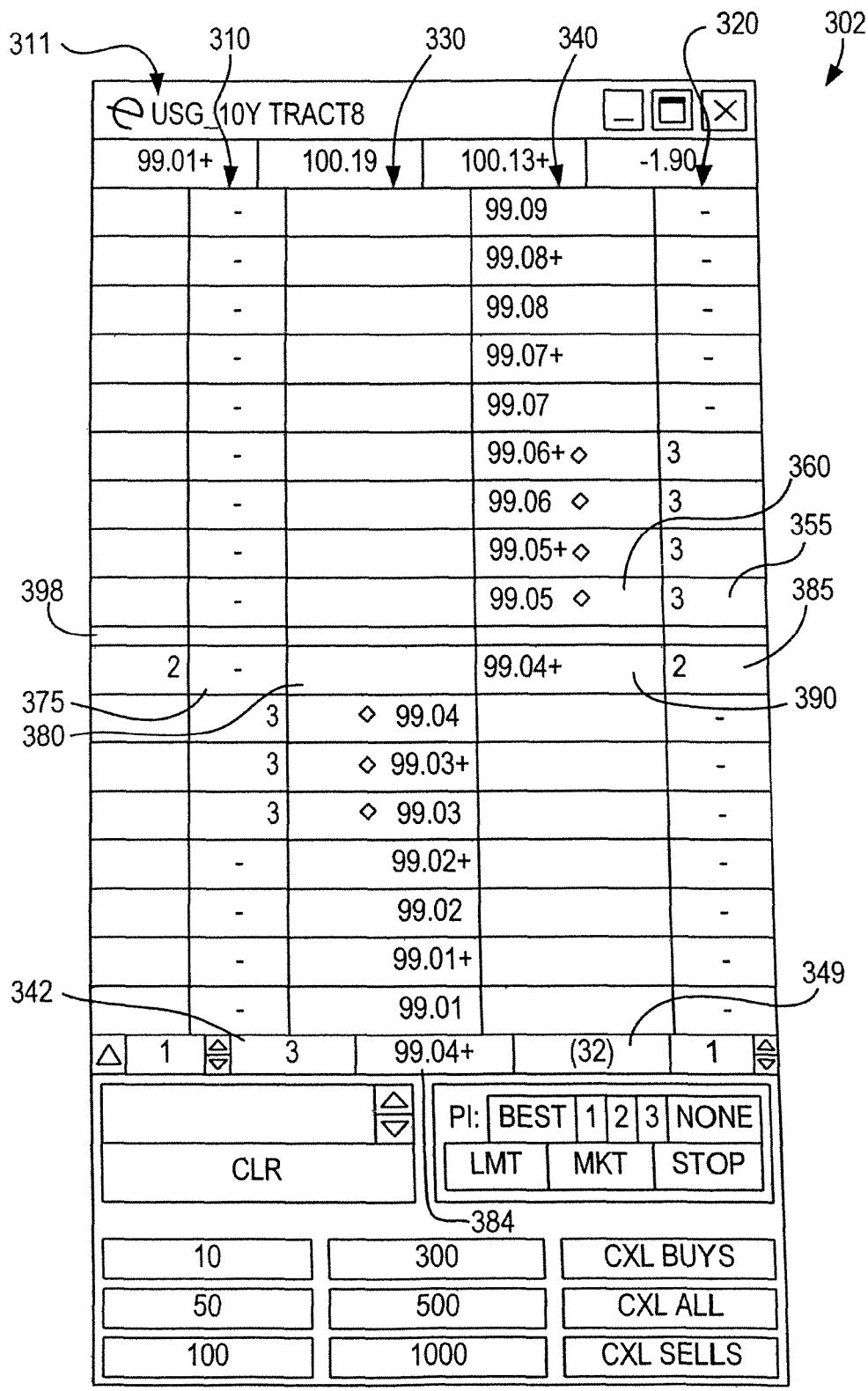

FIGS. 3A, 3B and 3C show alternative embodiments of an interactive display that may be used in some embodiments of the invention. FIG. 3A shows interactive display 300 of a market at a particular time. Display 300 preferably includes bid size column 310, ask size column 320, bid price column 330 and ask price column 340. Bid size column 310 preferably displays the size of bids available at the corresponding price shown in bid price column 330, while ask size column 320 preferably displays the size of asks available at the corresponding price shown in the ask price column 340.

An indication of the inside market may be shown by highlighted cells 355, 360, 375 and 380, or using any other suitable visual indicator or method. The inside market may include bid size 3, available at best bid price 99.04+, and ask size 3, available at best ask price 99.05.

Interactive trading using the displays in FIGS. 3A, 3B and 3C may be implemented as described in connection with FIGS. 2A and 2B. In addition, the interactive displays in FIGS. 3A, 3B and 3C preferably include fields and keys that facilitate order entry and cancellation. For example, size keys 305 may be used to facilitate order entry by making preprogrammed size amounts available. Once a preprogrammed size is chosen, it may be set as the user's default size and may be displayed in fields 344 and/or 345. The user may alter the default size for bid/buy and ask/sell orders using up/down arrow keys 346 and 347, respectively.

Users may alternatively choose to enter their orders by typing commands in field 306, modifying them using up/down arrow keys 308 or clearing them using key 336. Cancel keys 304 may be used to facilitate canceling active orders. Order type may be chosen using limit order key 322, market order key 324 and stop order key 326. Additionally, a level of price improvement may be chosen using keys 328. Price improvement is described in commonly assigned U.S. patent application Ser. No. 10/171,009, filed Jun. 11, 2002, U.S. patent application Ser. No. 10/826,779 filed Apr. 16, 2004 and U.S. provisional patent application No. 60/613,830 filed Sep. 28, 2004 which are hereby incorporated by reference herein in their entireties.

Field 311 of FIG. 3 may display alphanumeric, or other, characters that include information that identifies the type of instrument or item being traded, the user, and/or any other appropriate information such as the date and time. Fields 312 and 314 may display the lowest and highest prices at which the item traded on the same day the bid/ask of columns 330 and 340 are shown. Field 316 may display the price at which the market for the same item closed the previous day. Field 348 may display the latest price at which the item traded, while field 342 may display the latest size traded. Field 349 may display the user's net volume position with respect to the item traded. Field 318 may display the net change in price—i.e., the difference between the latest price at which the item traded displayed in field 348 and the price at which the market for the item closed the previous day displayed in field 316.

Interactive display 301 of FIG. 3B shows the market of FIG. 3A at a later time when a bid for a particular price is matched. For example, a user may have decided to enter an order to sell a size of 5 at the best bid price 99.04+ shown in cell 380. In this situation, the size of 3 previously shown in cell 375 is sold, and cell 385 in column 320 is populated with the additional size of 2 asked at the same price of 99.04+. Cell 390 is temporarily populated with the size that is bought—i.e., 3—while an indicator displaying the word HIT is displayed in that cell as well. The indicator displaying the word HIT may be a blinking indicator, an indicator of varying degrees of intensity or any other appropriate visual indicator. The price displayed in field 348 may change to the latest price at which the user traded, which, in this case, is shown to have changed from 99.05 (see FIG. 3A) to 99.04+ (see FIG. 3B). The size displayed in field 342 may change to the latest size traded by the user, which, in this case, is shown to have changed from 10 (see FIG. 3A) to 3 (see FIG. 3B). The net change in price displayed in field 318 may change from −1.08+(the difference between 99.05 and 100.13+ as shown in FIG. 3A) to −1.09 (the difference between 99.04+ and 100.13+ as shown in FIG. 3B). The size displayed in field 349 may change to display the user's new net volume position with respect to the item traded, which, in this case, is shown to have increased by the size that was hit from a short position of 29 (see FIG. 3A) to 32 (see FIG. 3B).

Interactive display 302 of FIG. 3C shows the market of FIGS. 3A and 3B at yet a later time, particularly illustrating the net effect on changes in the display of the inside market in response to the exemplary change in market conditions enumerated above. Interactive display 302 shows cell 390 populated with a new best ask price 99.04+, and cells 375 and 380 depopulated. It should be noted that the price previously displayed as the best bid—i.e., 99.04+—has changed positions from cell 380 to cell 390 in response to changing market conditions. Thus, both bid price column 330 and ask price column 340 have changed whereby the sizes of the inside market and their positions in the display, as well as the representative prices associated therewith, have changed in response to changing market conditions. An indication of the new inside market may be shown by the newly highlighted cells. Both price columns 330 and 340 are therefore dynamic in that both change based on changing market conditions as the inside market changes.

The system may be adapted to display the inside market such that its position is substantially centered about area 398 in the interactive display when the interactive display is launched. See, e.g., FIG. 3A. As market conditions change, the position of the inside market may move up or down. See, e.g., FIG. 3C. The system may be adapted to automatically recenter the position of the inside market as market conditions change. For example, the system may be adapted to recenter the vertical position of the inside market after a particular number of movements of the inside market away from area 398. The system may also or alternatively be adapted to recenter the position of the inside market when either best bid or best ask prices will no longer remain in the visible portion of the display. The system may also or alternatively be adapted to periodically recenter the position of the inside market after a particular number of trades are completed. Alternatively, the user may take a particular action, such as clicking on area 398, in order to recenter the position of the inside market. The position of the inside market may be recentered at any time or for any other appropriate reason.

A user may alternatively trade by clicking on the cell displaying the desired price at which he or she is willing to trade. In some embodiments of the invention, a single click may actuate a trade at the displayed price and size. In other embodiments of the invention, a double click may actuate a trade. In the latter embodiments, a single click may cause an overlay window, a popup menu, a toolbar or a similar or different display or interface to be displayed. In these situations, following the first click, the mouse pointer may warp to a button displaying the default selection in order to confirm the trade.

In some embodiments of the invention, the mouse pointer may warp to a button displaying the word "yes" or the like in order to confirm the trade following a first click.

Figure 7A:
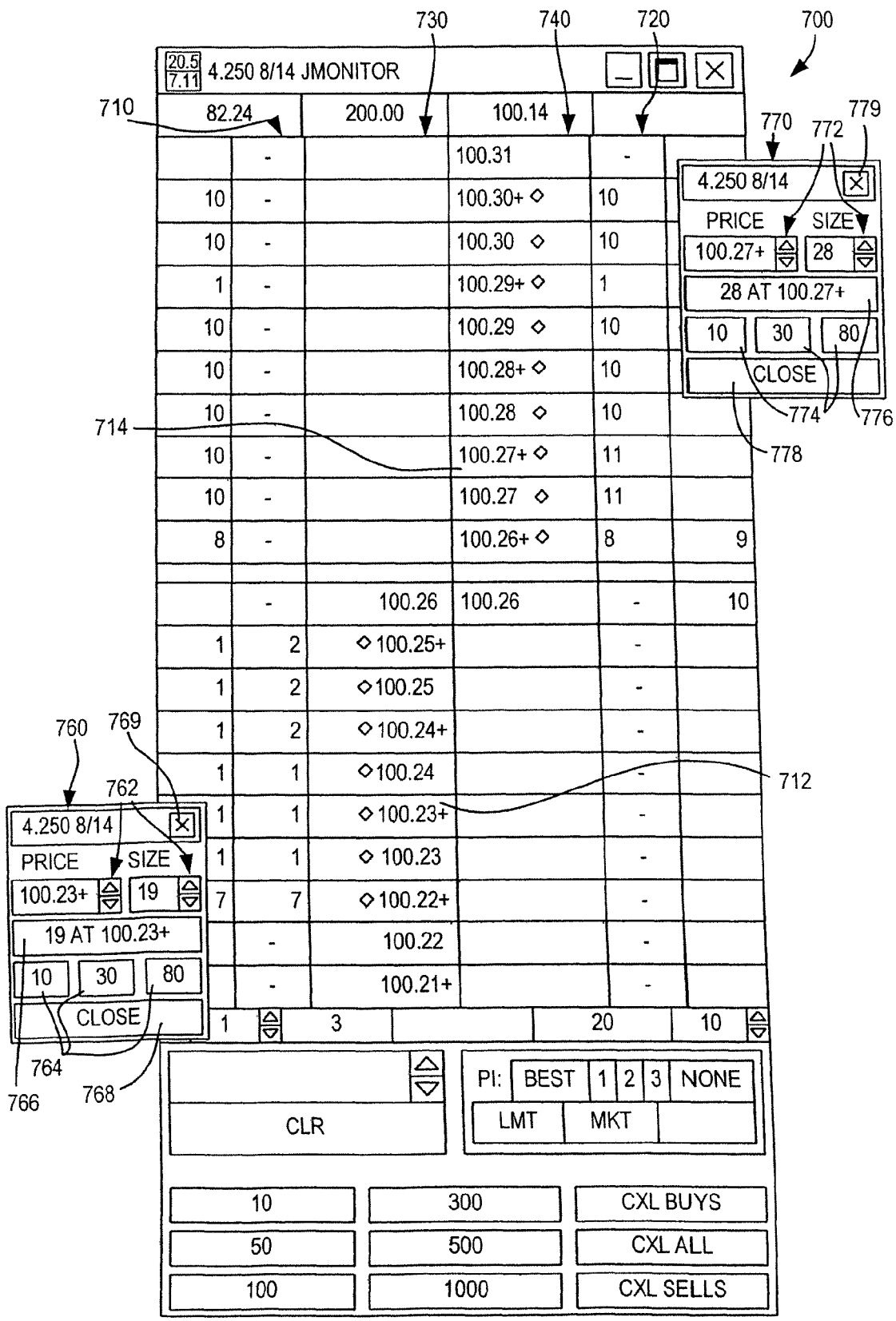
FIG. 7A is an illustration of exemplary display windows and yet another alternative embodiment of an exemplary interactive display that may be displayed to users in accordance with certain embodiments of the present invention.

In other embodiments of the invention, a first or subsequent step in the order entry process, such as a first click by the user, may cause another display showing the price and size selected (or the default size) as shown in interactive display 700 of FIG. 7A. For example, clicking on cell 712 or anywhere along the same row in columns 710 and 730 may cause display window 760 to be displayed and the mouse pointer to warp to button 766. Display window 760 may display the price reflected in cell 712—e.g., 100.23+—along with the size entered by the user—e.g., 19—or a default size associated with the user's bid preferences. The user may use display window 760 to adjust the selected price and/or size by using up/down arrow keys 762 or buttons 764 before confirming the bid by clicking on button 766, which may display the selected price and size and any adjustments thereto. A double click may essentially function as a bid at the price displayed in cell 712 for the user's default size by causing display window 760 to be displayed through the first click, and causing the order to be entered through the second click.

A user may cause as many display windows to be displayed as he or she desires before confirming a particular order. For example, while display window 760 is displayed, the user may click on cell 714 or anywhere along the same row in columns 740 and 720 in order to cause display window 770 to be displayed and the mouse pointer to warp to button 776. Display window 770 may display the price reflected in cell 714—e.g., 100.27+'along with the size entered by the user—e.g., 28—or a default size associated with the user's ask preferences. The user may use display window 770 to adjust the selected price and/or size by using up/down arrow keys 772 or buttons 774 before confirming the ask by clicking on button 776, which may display the selected price and size and any adjustments thereto. The user may revert back to a previously opened display window in order to enter the previously prepared order or may simply cancel the order closing the display window—e.g., by clicking on field 769/779, by clicking on button 768/778 or by any other suitable method.

Figure 7B:
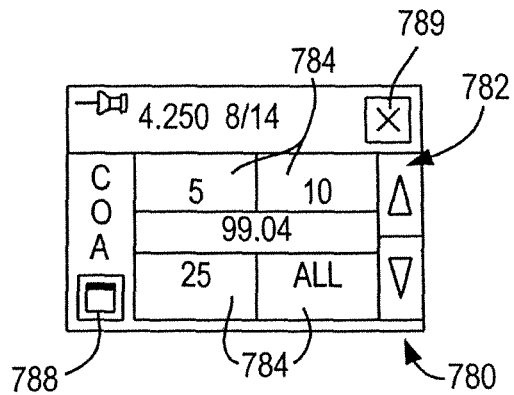
FIG. 7B is an illustration of an alternative embodiment of an exemplary display window that may be displayed to users in accordance with certain embodiments of the present invention.

FIG. 7B shows an alternative display window that may be displayed in response to a first or subsequent step in the order entry process, such as a first click by the user. Display window 780 may display the selected price along with various size options that may be selected by the user. The user may use display window 780 to adjust the selected price by using up/down arrow keys 782 before confirming the order by clicking on one of size buttons 784. Display window 780 may include Close-on-Action (COA) field 788 which, if selected, may cause the display to be closed once a size button 784 is clicked. Otherwise, if COA field 788 is not selected, display window 780 may remain open—i.e., displayed to the user—after a size button 784 is clicked to enter the order. The user may cancel the order by closing the display window—e.g., by clicking on field 789—or by any other suitable method.

In yet other embodiments of the invention, a first click may cause another display window to be displayed. The display window may or may not be relatively transparent and may contain a set of alternative sizes from which the user may choose before confirming the order through a second click. Examples of such embodiments are shown in FIGS. 8A, 8B, 8C, 9, 10A and 10B. In alternative embodiments of the invention, the user may cause a dialog box, a popup menu, a toolbar or a pane to be displayed along with the selected price or may populate a command line with the selected price. For example, in some embodiments of the invention, the user may cause to be displayed a pane containing a set of alternative sizes that the user may drag and drop into the cell indicating the desired bid or ask price in the interactive display.

Figure 8C:
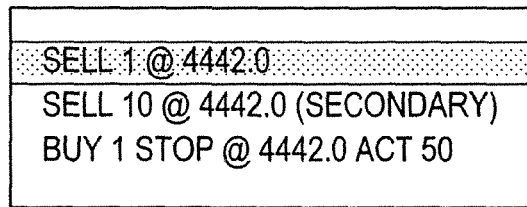
FIG. 8C is an illustration of yet another alternative embodiment of an exemplary display window that may be displayed to users in accordance with certain embodiments of the present invention.
Figure 8A:
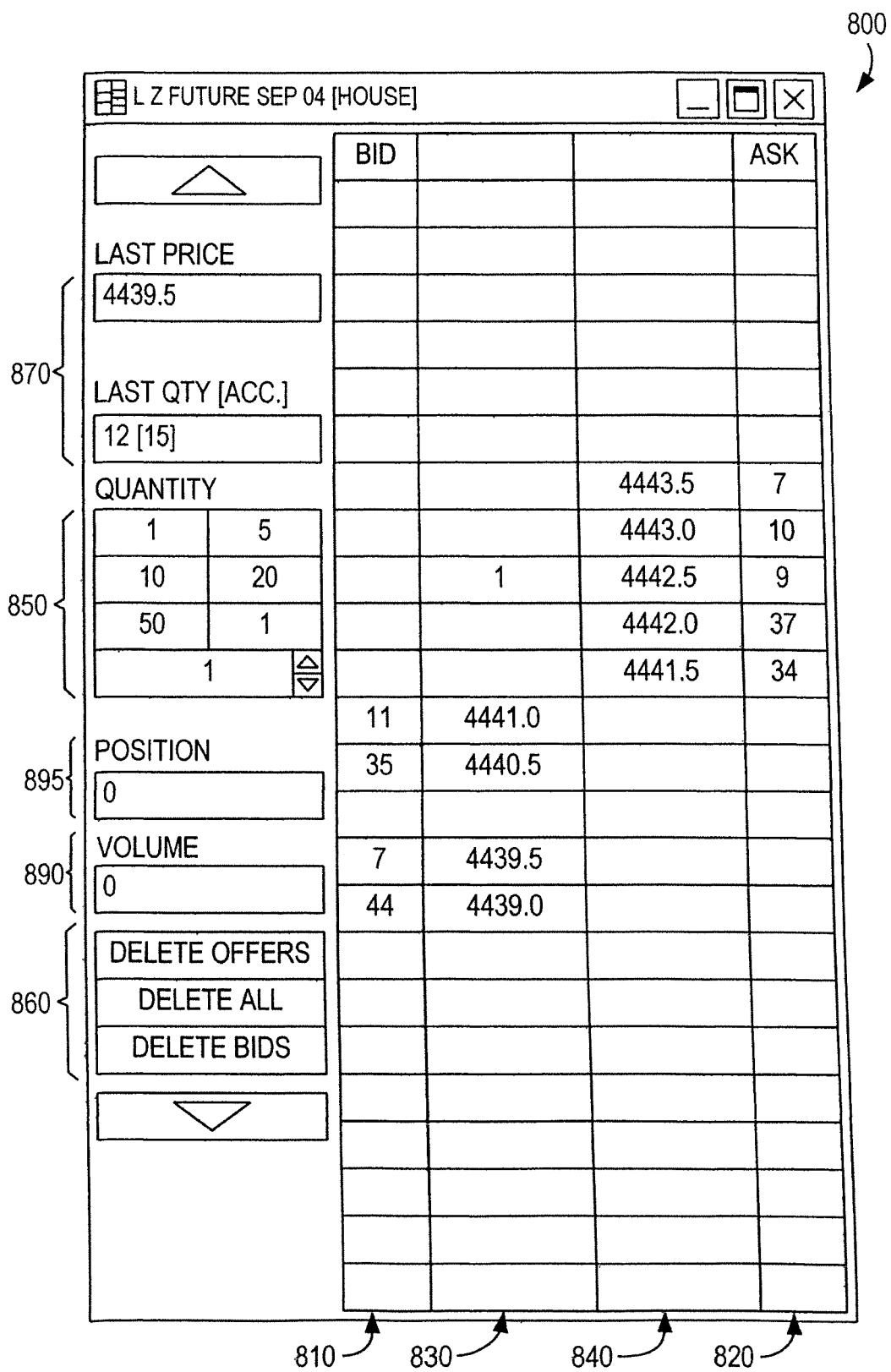
FIG. 8A is an illustration of yet another alternative embodiment of an exemplary interactive display that may be displayed to users in accordance with certain embodiments of the present invention.
Figure 8B:
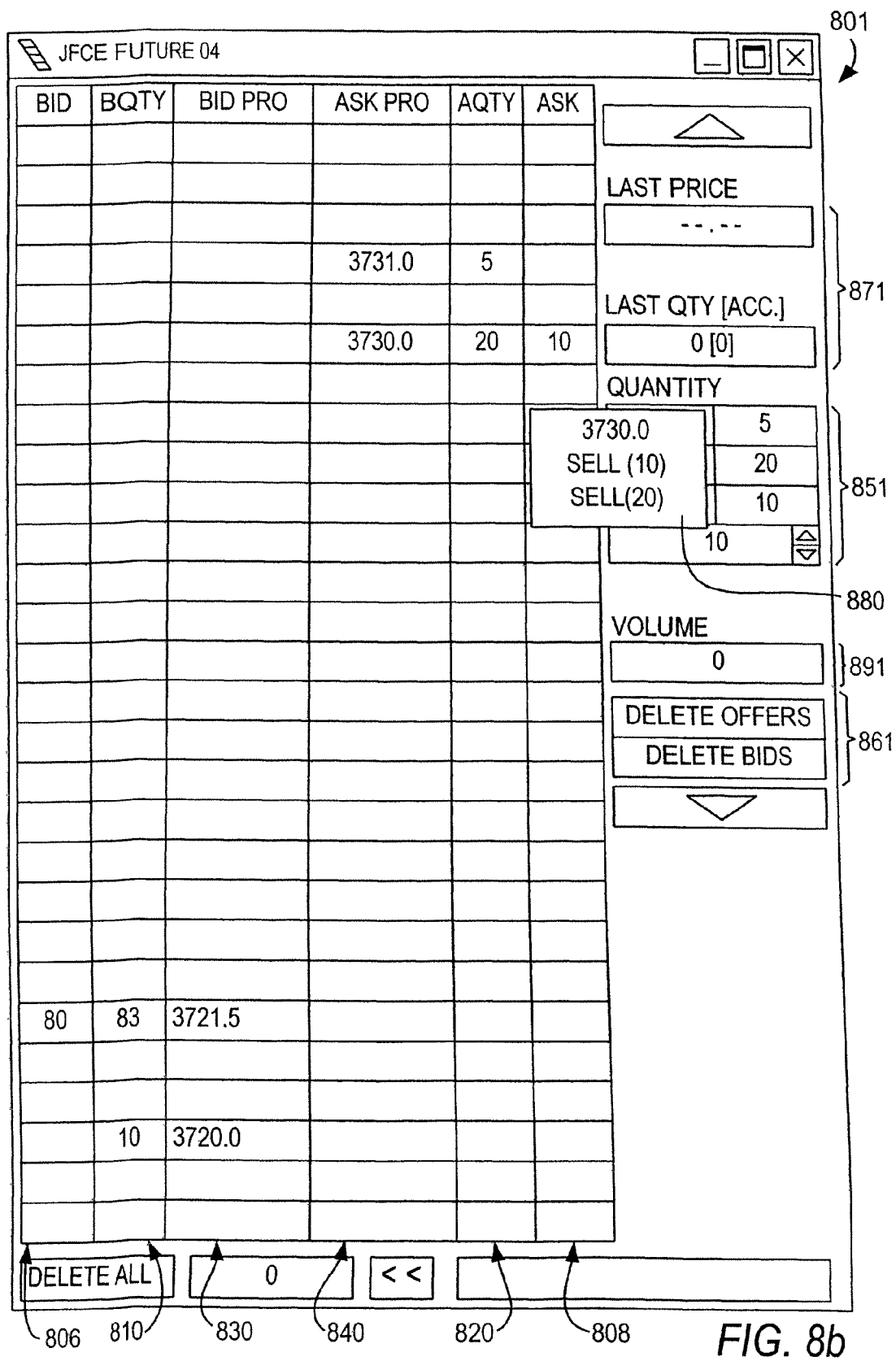
FIG. 8B is an illustration of yet other alternative embodiments of an exemplary display window and an exemplary interactive display that may be displayed to users in accordance with certain embodiments of the present invention.

FIGS. 8A and 8B show interactive displays that may be used in some embodiments of the invention. Interactive displays 800 of FIG. 8A, as well as interactive display 801 of FIG. 8B, may preferably include bid size column 810, ask size column 820, bid price column 830 and ask price column 840. Interactive display 801 of FIG. 8B may additionally include bid volume column 806 and ask volume column 808 to indicate the total sizes of items traded by the user since the launching of the trading application. Alternatively, the total sizes of items traded may be customized to include the total sizes of items traded in the market, using the trading system, by all users pertaining to a defined group of users, by a particular firm, by anyone using the trading application, etc.

Interactive displays 800 and 801 of FIGS. 8A and 8B may also include size keys 850 and 851, respectively, to facilitate order entry by making preprogrammed/adjustable size amounts available. Interactive displays 800 and 801 may include fields 870 and 871 which may display the latest price and size at which the item traded, while fields 890 and 891 may display the total size traded by the user since the launching of the trading application. Alternatively, the total size traded may be customized to include the total size of items traded in the market, using the trading system, by all users pertaining to a defined group of users, by a particular firm, by anyone using the trading application, etc. Interactive displays 800 and 801 may also include other useful fields and keys, such as delete keys 860 and 861 which facilitate canceling active orders. For example, FIG. 8A may also include field 895 which may display the user's net volume position with respect to the item traded.

FIG. 8B also shows interactive display 801 displaying display window 880 upon selection of price 3730.0 from ask price column 840. Display window 880 may display the selected price and may display different size options, including an option not to trade any size at all, that the user may toggle between by moving the mouse pointer. FIG. 8C shows another embodiment of a display window 881 that may be displayed upon selection of, for example, price 4442.0 from ask price column 840 of FIG. 8A.

Figure 9:
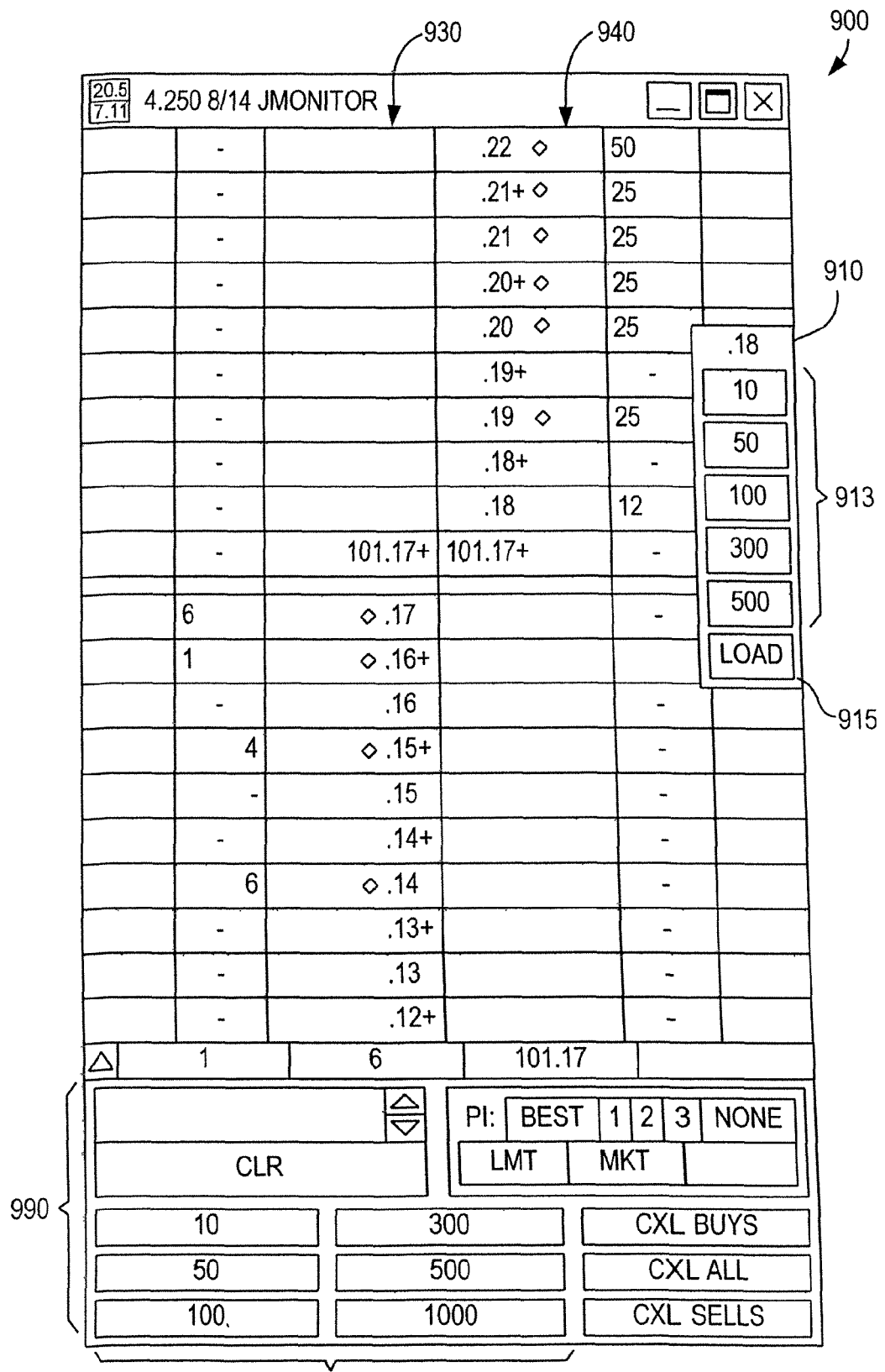
FIG. 9 is an illustration of yet other alternative embodiments of an exemplary display window and an exemplary interactive display that may be displayed to users in accordance with certain embodiments of the present invention.

FIG. 9 shows interactive display 900 displaying display window 910 upon selection of price 101.18—displayed as 0.18 without the price handle—from ask price column 940. Once the price is selected through a first click, the mouse pointer may warp to display window 910. More specifically, the mouse pointer may warp to a particular button, such as a default size button from listed size buttons 913, in display window 910—e.g., the button displaying a size of 100. Display window 910 may also display the selected price with or without displaying the price handle. Once the desired size button is clicked, the order may be entered. Alternatively, the user may cause a display window to be displayed, as shown in FIGS. 7A and 7B, by clicking on load button 915.

Figures 10A, 10B:
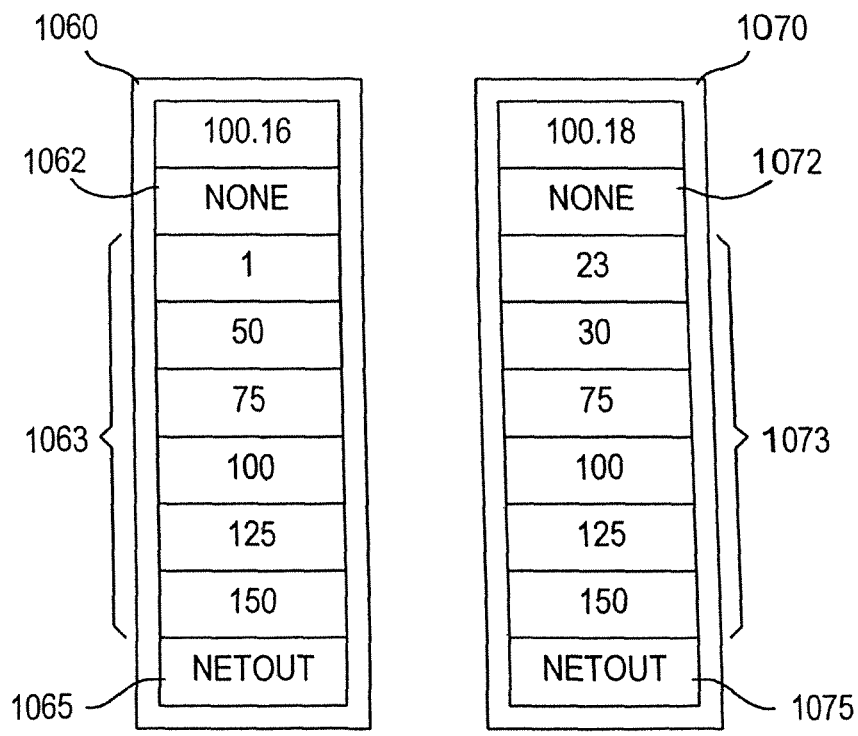
FIGS. 10A-10B are illustrations of yet other alternative embodiments of exemplary display windows that may be displayed to users in accordance with certain embodiments of the present invention.

FIGS. 10A and 10B show alternative display windows 1060 and 1070, respectively, that may be displayed to the user. The interactive display may display display window 1060 of FIG. 10A upon selection of price 101.16 from bid price column 930 of FIG. 9. Once the price is selected through a first click, the mouse pointer may warp to a default size button from listed size buttons 1063 in display window 1060. Once the desired size button is clicked, the order may be entered. The user may cancel his or her order by clicking on none button 1062. Alternatively, the user may click on netout button 1065 in order to trade a size corresponding to the size needed to balance the user's net volume position with respect to the item being traded. For example, if the user is long 29, clicking on netout button 1065 would cause him to sell a size of 29. If the user does not have a long position, then display window 1060 may not display netout button 1065 to the user.

Similarly, the interactive display may display display window 1070 of FIG. 10B upon selection of price 101.18 from ask price column 940 of FIG. 9. Once the price is selected through a first click, the mouse pointer may warp to a default size button from listed size buttons 1073 in display window 1070. Once the desired size button is clicked, the order may be entered. The user may cancel his or her order by clicking on none button 1072. Alternatively, the user may click on netout button 1075 in order to trade a size corresponding to the size needed to balance the user's net volume position with respect to the item being traded. For example, if the user is short 12, clicking on netout button 1075 would cause him to buy a size of 12. If the user does not have a short position, then display window 1070 may not display netout button 1075 to the user.

In alternative embodiments of the invention, the interactive display may give the user the opportunity to trade the size needed to balance the user's net volume position regardless of whether the user is long or short with respect to the item being traded. For example, such a feature may be implemented through a netout button, similar to the one illustrated in each of FIGS. 10A and 10B, as part of the display window that is displayed to the user after a particular price is selected or appropriate action is taken, or through any other appropriate method.

As before, a double click may function as an order entry at the price displayed in any of display windows 910, 1060 and 1070 for the user's default size by causing the display window to be displayed through the first click, and causing the order to be entered through the second click. For example, display window 1070 may be displayed upon selection of price 101.18 from ask price column 940. Once the price is selected through a first click, the mouse pointer may warp to a button listing the user's preset default size, the size previously entered by the user using size keys 990 of FIG. 9 or the size displayed in the corresponding size column in display window 1070 of FIG. 10B. The second click may then enter the order for that size at that price.

It should be noted that a single click may serve as an alternative to a double click whenever possible and appropriate, whereby a downclick may perform the same function as a first click, and a release or an upclick may perform the same function as a second click. For example, a downclick on the appropriate cell within ask price column 940 in FIG. 9 may cause display window 910 to be displayed and cause the mouse pointer to warp to a default size button. The user may select an alternative size or cause a display window to be displayed by moving the mouse pointer, or scrolling up or down the display window using the mouse wheel, and enter the order by releasing the mouse button. The user may choose to cancel by moving the mouse pointer away from display window 910 and releasing the mouse button.

FIGS. 11A, 11B and 11C illustrate an example of an order entry process according to some embodiments of the invention. The best bid price may be 99.24+ because it is the highest price at which some size is bid. Similarly, the best ask price may be 99.256. Prices that are within the inside market may be displayed even though no size is bid nor asked at such levels. As shown in FIG. 11A, the user may use a pointing device to move pointer 1111 to the location of cell 1180 in bid price column 1130 displaying price 99.252, and downclick on cell 1180 using a left click button. In response to this action, display window 1160 showing the selected price is displayed and pointer 1111 warps to button 1161, as shown in FIG. 11B, which displays the default bid size chosen by the user and shown in field 1150. If the user decides not to alter the size, he or she may release the pointing device's left click button, thereby entering an order to bid a size of 1 at the price of 99.252. As shown in FIG. 11C, cell 1175 in bid size column 1110 is then populated to reflect the size of the entered bid, while cells 1190 and 1195 in ask size column 1140 are depopulated because they no longer reflect price levels that are within the inside market and lower than the new best bid 99.252.

In yet other embodiments of the invention, clicking anywhere outside the interactive display or within the interactive display may cause a trading interface, such as a dialog box, to be displayed. The trading interface may contain default price and size values and, depending on where the click occurred, may warp to one of multiple buttons for entering a bid, ask, buy or sell order. The user may customize which button to warp to. The user may use the trading interface to completely alter his or her order.

Once the user enters an order at a particular price for a particular size, the size entered by the user may be displayed in a dedicated column within the interactive display, such as the left-most columns shown in, for example, FIGS. 3A-3C and 7A. Alternatively, the size entered by the user may be displayed in the unused space within existing columns of the interactive display, as shown in, for example, FIGS. 12A-12D.

FIG. 12A shows interactive display 1200 whereby the user's share of size—i.e., the size entered by the user—at a given price is displayed in a cell within bid or ask price columns 1230 and 1240 that is in the same row as, and is adjacent to, the corresponding price. Accordingly, while columns 1210 and 1220 may display the total size of bids and asks available at each price level, cells that do not display prices in columns 1240 and 1230 may display the user's share of that size, respectively.

FIG. 12B, on the other hand, shows interactive display 1201 whereby the user's share of size at a given price is displayed in the same cell as the corresponding price within bid or ask price columns 1230 and 1240. Each price cell for which a corresponding user size exists may be split into two cells: one for displaying the price and one for displaying the user's share of size as shown in some of the cells in bid price column 1230. Alternatively, both the price and the user's share of the size may be displayed in the price cell, as shown in some of the cells in ask price column 1240. Accordingly, while columns 1210 and 1220 may display the total size of bids and asks available at each price level, cells that display the corresponding prices in columns 1230 and 1240 may display the user's share of that size, respectively. For example, cell 1280 indicates that the user entered a bid for 6 out of the 103 shown in cell 1202 at a price of 101.17.

FIG. 12C shows an alternative illustration of cell 1280 in which the price handle is displayed along with the user's share of size. In this example, cell 1282 indicates that the user entered a bid for 6 at a price of 101.17. The physical area of a display screen for a user such as a financial customer is highly valued because large amounts of critical information should be communicated to the customer, and, at times, moved or changed when displayed to the customer. Accordingly, displaying several data elements in a single cell may result in the efficient delivery of information to the user through efficient use of display space.

Accordingly, in alternative embodiments of the invention, FIG. 12D illustrates yet another method of displaying the user's share of size—e.g., 6—as well as the total size—e.g., 103—in the same cell 1284. In this example, cell 1284 indicates that the user entered a bid for 6 out of the 103 at a price of 101.17. This embodiment therefore does away with the need for separate bid and ask size columns, thereby reducing the total number of axes needed to convey the same information to users. In some embodiments of the invention, an additional column, such as volume column 1250 of FIGS. 12A and 12B, may be provided to indicate the total size of items traded at each price level by the user since the launching of the trading application. Alternatively, the total size of items traded may be customized to include the total size of items traded in the market, using the trading system, by all users pertaining to a defined group of users, by a particular firm, by anyone using the trading application, etc. See also, e.g., the right-most column in each of FIGS. 4, 5A, 5B, 6A-6D, 7A. Such a column may be displayed in order to take advantage of some of the physical space saved by the elimination of the size columns and to provide users with additional information. Alternatively, two such columns may be displayed to distinguish between the total size of items bought and sold.

In yet other alternative embodiments of the invention, the size of an in-transit order or the total size of a completed trade may be displayed alongside the bid or ask size in the same cell as the corresponding bid or ask price, as shown in FIG. 12D.

FIG. 13 shows an alternative interactive display 1300 that also does not include an additional axis to convey the same information to users and that may instead display a volume column. More specifically, interactive display 1300 preferably includes bid price column 1330 and ask price column 1340 in addition to volume column 1350 to indicate the total size of items traded by the user at each price level since the launching of the trading application, or, alternatively, to indicate the user's share of size. The total size of items traded may be customized to include the total sizes of items traded in the market, using the trading system, by all users pertaining to a defined group of users, by a particular firm, by anyone using the trading application, etc. Interactive display 1300 preferably combines the size columns that can be seen in other figures into a single size column 1315. Size column 1315 may display the bid size in cells that are in the same row as the populated cells in bid price column 1330. Similarly, column 1315 may display the ask size in cells that are in the same row as the populated cells in ask price column 1340.

The options selected by the user when customizing different aspects of the user interface, as referred to in the foregoing, may be stored in one or more configuration files on a user's workstation (e.g., workstation 110 of FIG. 1) or on a central server (e.g., server 120 of FIG. 1). The trading application may prompt the user as to whether certain options are to be saved in the configuration file(s). The trading application may automatically save such options in multiple files so that previously customized interfaces may be subsequently used by the same or a different user. Such files may be discarded by the user or by the trading application if unused after a number of days. Such files may alternatively be shared with other users or stored as firm-wide configuration files that may be distributed by a trading firm to its users. At any point in time after launching the trading application, a user may select or download one such configuration file, thereby customizing his or her trading interface. Alternatively, the trading application may load a configuration file containing default options that may be set by, for example, the trading firm.

The trading methods described above, or variation thereof, may be implemented in conjunction with the interactive displays discussed or shown herein, or in conjunction with variations on those displays. For example, the user may enter bid and ask orders by clicking on the cells displaying the desired prices from columns 1330 and 1340, respectively. The user may invoke a display window, a dialog box, a popup menu, a toolbar, a pane or a command line or any other suitable trading interface when clicking on a cell in column 1315. The user may use such an interface to enter his or her buy or sell order.

In some embodiments of the invention, an interactive electronic trading system for trading an item between users may include one or more programmed computers that may enable a first user to enter a bid, ask, buy or sell order for the item at a select price. In some embodiments, the system may receive a bid, ask, buy or sell order entered by a second user to trade the item at the select price. In some embodiments, the system may execute a trade in accordance with the bid, ask, buy or sell order. The system may enable one or more users to trade additional size at the select price. In some embodiments, the system preferably will queue a user that enters a bid, ask, buy or sell order to trade at a price other than the select price. In some embodiments of the invention, the system may guarantee the completion of at least a portion of the queued bid, ask, buy or sell order at a price no worse than the price of the queued bid, ask, buy or sell order. In some embodiments, the system preferably will hold an order that is contra to the queued bid, ask, buy or sell order at a price no worse than the price of the queued bid, ask, buy or sell order for a period of time. In some embodiments, the system may, during the period of time, determine availability of a contra order in the system at a price better than the price of the held contra order. The system may on occurrence of the determination of the available contra order at the better price, match the queued bid, ask, buy or sell order with the available better price. On occurrence of the determination of no available contra order at the better price, the system may match the queued bid, ask, buy or sell order with the held contra order.

The system may guarantee the completion by displaying a message to the queued user, the message may include the price of the held contra order, a confirmation of the completion of at least a portion of the queued bid, ask, buy or sell order, and/or the size of the guaranteed completion.

One of ordinary skill in the art should appreciate that the invention may be practiced in embodiments other than those described herein. For example, it will be understood that the size, shape, arrangement, color, and label of various portions of the interactive displays discussed or shown are examples shown for purposes of illustration only. It will be understood that modifications of any or all of the foregoing characteristics of these portions are within the scope of the invention. Embodiments discussed or shown herein may be applied to trading interfaces that use single static price axis, dual dynamic price axis, or any other suitable display.

As another example, it will be understood that the trading application discussed herein may be any suitable, software, hardware, or both configured to implement the features of the invention. The trading application may be located at a central location (e.g., a central server such as server 120 of FIG. 1) and instances thereof may be stored on workstations connected thereto (e.g., workstations 101 of FIG. 1). In another suitable approach, the trading application may reside among different locations (e.g., a network such as computer network 103 of FIG. 1).

Moreover, the interactive displays described and shown may be used in any kind of trading application, system or exchange such as auction trading systems, interactive matching systems, automated matching systems, price improvement systems, FIFO (First In, First Out) systems, RFQ (Request for Quote) systems, etc., and may be applied to the trading of any types of items. This includes cases where users are or are not granted exclusive rights to trade, cases where users are or are not provided with a share of a trade based on their status or market role, the stage during which they start or join a trade and/or their degree or extent of participation, cases where users are or are not provided with shares of a trade on a pro-rata basis based on existing agreements or distribution algorithms, or any combination of the same.

It will be understood that the foregoing is only illustrative of the principles of the invention, and that various modifications can be made by those skilled in the art without departing from the scope and spirit of the invention, and the invention is limited only by the claims that follow.

What is claimed is:

1. A method comprising the steps of:
   displaying a plurality of bid prices associated with an item to be traded in an electronic trading system, the bid prices displayed in a contiguous rectangle to define a bid price region within a user interface displayed on a workstation connected to the electronic trading system, at least one of the bid prices having associated quantities displayed therewith;
   displaying a plurality of ask prices associated with the item in a contiguous rectangle to define an ask price region within the user interface, at least one of the ask prices having associated quantities, the ask price region being discontinuous with and parallel to the bid price region, the bid prices and ask prices within the parallel bid and ask regions both increasing from small to large in the same direction; and
   displaying in association with the highest price at which a bid order exists (best bid) and lowest price at which an ask order exists (best ask) a visual indication of an inside market associated with the item; and
   when the inside market changes, automatically moving at least one of the plurality of displayed prices between the bid price and the ask price regions within the user interface, and maintaining the visual indication in association with the displayed prices to indicate the best bid and best ask.

2. The method of claim 1 wherein the displayed indication of the inside market changes locations within the user interface when the inside market changes.

3. The method of claim 1 further comprising displaying an indication of the change of locations of the at least one of the plurality of prices displayed.

4. The method of claim 1 further comprising:
   for at least one of the displayed prices, displaying only a portion of a price, and for other displayed prices, displaying the entire price.

5. The method of claim 1 further comprising:
   displaying only prices at which a pending bid or ask order for the item exists, and omitting display of prices having no pending orders.

6. The method of claim 1 further comprising calculating and displaying a volume-weighted average price for orders that are not displayed.

7. The method of claim 1 further comprising displaying a price that is selected from a particular group of prices that were not previously displayed.

8. The method of claim 1 further comprising displaying at least one order entry region for receiving an input from a user.

9. The method of claim 8 wherein the at least one order entry region is adapted to allow the user to trade a size corresponding to a size needed to balance the user's net volume position with respect to the item.

10. The method of claim 8 wherein the at least one order entry region is adapted to allow the user to modify a type of order the user chooses to enter.

11. The method of claim 1, further comprising the step of:
    displaying an indication of existence of orders at price levels between those displayed in the two regions.

12. The method of claim 1 wherein the plurality of ask prices are displayed along an ask price and wherein the plurality of bid prices are displayed along a bid price axis.

13. The method of claim 12 further comprising displaying a plurality of quantities along an ask quantity axis that is aligned with the ask price axis wherein at least one of the plurality of quantities displayed corresponds to at least one order for the item at a price displayed in a location along the ask price axis that is aligned with a location of the displayed size along the bid price axis.

14. The method of claim 13 wherein at least one of the plurality of quantities corresponds to an in-transit order for the item.

15. The method of claim 13 wherein at least one of the plurality of quantities corresponds to a total size of completed trades on the item.

16. The method of claim 13 wherein at least one of the plurality of quantities corresponds to a user's share of the at least one order for the item.

17. The method of claim 13 wherein the plurality of quantities comprise a first plurality of quantities, each one of which comprises at least one order to buy the item.

18. The method of claim 17 wherein the ask quantity axis is further aligned with the bid price axis and wherein the plurality of quantities comprise a second plurality of quantities, each one of which comprises at least one order to sell the item.

19. The method of claim 17 further comprising:
displaying a second plurality of quantities along a bid quantity axis that is aligned with the bid price axis wherein at least one of the second plurality of quantities displayed corresponds to at least one order to sell the item at a price displayed in a location along the bid price axis that is aligned with a location of the displayed size along the bid quantity axis.

20. The method of claim 13 wherein the plurality of quantities comprise a first plurality of quantities, the method further comprising displaying a second plurality of quantities that are aligned with the first plurality of quantities.

21. The method of claim 20 wherein the at least one of the second plurality of quantities corresponds to an in-transit order for the item.

22. The method of claim 1 further comprising centering the displayed indication of the inside market within the user interface.

23. A tangible computer-readable memory having stored therein one or more programs designed to cause computers of an electronic trading system to:
display a plurality of bid prices associated with an item to be traded in an electronic trading system, the bid prices displayed in a contiguous rectangle to define a bid price region within a user interface displayed on a workstation connected to the electronic trading system, at least one of the bid prices having associated quantities displayed therewith;
display the plurality of ask prices associated with the item in a contiguous rectangle to define an ask price region within the user interface, at least one of the ask prices having associated quantities, the ask price region being discontinuous with and parallel to the bid price region, the bid prices and ask prices within the parallel bid and ask regions both increasing from small to large in the same direction; and
display in association with the highest price at which a bid order exists (best bid) and lowest price at which an ask order exists (best ask) a visual indication of an inside market associated with the item and when the inside market changes, automatically move at least one of the plurality of displayed prices between the bid price and the ask price regions within the user interface, and maintaining the visual indication in association with the displayed prices to indicate the best bid and best ask.

24. The memory of claim 23, the program(s) being further designed to:
change the location of the displayed indication of the inside market within the user interface when the inside market changes.

25. The memory of claim 23, the program(s) being further designed to:
display an indication of the change of locations of the at least one of the plurality of prices displayed.

26. The memory of claim 23, the program(s) being further designed to:
for at least one of the displayed prices, display only a portion of at least one of the displayed prices, and for other displayed prices, displaying the entire price.

27. The memory of claim 23, the program(s) being further designed to:
display only prices at which a pending order for the item exists, and omit display of prices having no orders.

28. The memory of claim 23, the program(s) being further designed to:
calculate and display a volume-weighted average price for orders that are not displayed.

29. The memory of claim 23, the program(s) being further designed to:
display an indication of existence of orders at price levels between those displayed in the two regions.

30. The memory of claim 29, wherein the indicated orders existing between displayed prices are at price increments other than a standard price increment used by the trading system.

31. The memory of claim 23, the program(s) being further designed to:
display the plurality of ask prices along an ask price axis and to display the plurality of bid prices along a bid price axis parallel to but displaced from the ask price axis.

32. The memory of claim 31, the program(s) being further designed to:
display a plurality of quantities along an ask quantity axis that is parallel to the ask price axis, the quantities in the ask quantity axis being aligned with corresponding prices of the ask price axis.

33. The memory of claim 23, the program(s) being further designed to:
maintain the display of the inside market at or near a central location within the user interface.

* * * * *